United States Patent
Hoshino

(10) Patent No.: US 8,421,922 B2
(45) Date of Patent: Apr. 16, 2013

(54) DISPLAY DEVICE, FRAME RATE CONVERSION DEVICE, AND DISPLAY METHOD

(75) Inventor: Takaya Hoshino, Saitama (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 13/079,258

(22) Filed: Apr. 4, 2011

(65) Prior Publication Data

US 2011/0285902 A1   Nov. 24, 2011

(30) Foreign Application Priority Data

May 19, 2010   (JP) ................................. 2010-115796

(51) Int. Cl.
*H04N 5/50* (2006.01)
*H04N 5/445* (2011.01)
*H04N 11/00* (2006.01)

(52) U.S. Cl.
USPC ............................ 348/569; 348/441; 348/564

(58) Field of Classification Search .................. 348/441, 348/564, 569, 607, 565, 584, 589, 598, 600; 345/611, 625–629, 634, 636
See application file for complete search history.

(56) References Cited

U.S. PATENT DOCUMENTS

| 7,536,547 | B2 | 5/2009 | Van Den Tillaart |
| 2004/0085480 | A1* | 5/2004 | Salzer et al. ................... 348/584 |
| 2008/0028431 | A1* | 1/2008 | Park ................................. 725/90 |
| 2008/0181312 | A1* | 7/2008 | Kimura .................... 375/240.27 |
| 2008/0211968 | A1* | 9/2008 | Murakami et al. ............ 348/699 |
| 2009/0059068 | A1* | 3/2009 | Hanaoka et al. .............. 348/459 |
| 2009/0059074 | A1* | 3/2009 | Suematsu et al. ............. 348/569 |
| 2009/0207183 | A1* | 8/2009 | Matsuura ...................... 345/606 |
| 2010/0178038 | A1* | 7/2010 | Ju ................................. 386/109 |

FOREIGN PATENT DOCUMENTS

| JP | 2005-192198 | 7/2005 |
| JP | 2010-56694 | 3/2010 |

* cited by examiner

*Primary Examiner* — Victor Kostak

(74) *Attorney, Agent, or Firm* — Oblon, Spivak, McClelland, Maier & Neustadt, L.L.P.

(57) ABSTRACT

A display device includes: a frame rate conversion section performing frame rate conversion through performing a frame interpolation process on a composite picture frame with use of a motion vector, in which the composite picture frame is generated through superimposing an OSD picture, i.e., on-screen display picture, on a picture frame; and a display section performing picture display based on a frame-rate-converted composite picture frame provided from the frame rate conversion section. The frame rate conversion section selectively performs the frame interpolation process to each pixel or to every plural pixels in the composite picture frame based on OSD region information indicating an OSD picture region.

16 Claims, 19 Drawing Sheets

DISPLAY DEVICE, FRAME RATE CONVERSION DEVICE, AND DISPLAY METHOD

BACKGROUND OF THE INVENTION

1. Field of the Invention

The present invention relates to a display device, a frame rate conversion device, and a display method with which an On-Screen Display (OSD) is generated.

2. Description of the Related Art

Thanks to the recent electronic devices with the advanced capabilities, the setting thereof is now often made by on-screen displays (OSDs). For the setting of a picture display device including a television receiver, a DVD (Digital Versatile Disc; trade mark) player, or others by on-screen displays as such, a menu for setting (on-screen display) is superimposed on picture information for display on the picture display device. An example includes Japanese Unexamined Patent Application No. 2005-192198. The resulting display menu guides a user to make the setting of the picture display device, and he or she may find it easier to complete the setting.

As to the picture display device, picture signal processing is performed therein with the aim of increasing the image quality. Such picture signal processing includes frame rate conversion using frame interpolation. With this frame rate conversion, an interpolation frame is generated for each two frames adjacent to each other in input picture, and the resulting interpolation frames are added to the input picture. An example includes Japanese Unexamined Patent Application No. 2010-56694. With the frame rate conversion as such, the resulting picture look much smoother on the display, and are with the less so-called motion blurring that is caused by pixels remaining in the same state for the duration of a frame in a liquid crystal display device, for example. As such, the frame rate conversion accordingly increases the image quality of the picture display device.

SUMMARY OF THE INVENTION

In the picture display device, such frame rate conversion is sometimes performed to picture information already superimposed with an on-screen display. In this case, when the picture information not yet with an on-screen display is moving pictures, and when the on-screen display is a still image, the interpolation frame having an error at the boundary of the on-screen display and therearound may be generated due to the interpolation performed differently to a region of the moving images and to a region of the still image. Also, when the picture information is so superimposed that the on-screen display is displayed in translucent or see-through fashion, even if the on-screen display is a still image, there may be a possibility of the interpolation to be performed in accordance with the picture information, i.e., the moving images, visible through the on-screen display. If this is the case, the resulting interpolation frame(s) may be with an error. Moreover, also when the on-screen display is a still image, if the on-screen display is with noise, the interpolation is to be performed in accordance with the noise so that the resulting interpolation frame(s) may be with noise.

It is desirable to provide a display device, a frame rate conversion device, and a display method that reduces any picture error and noise resulting from frame rate conversion in displaying of an on-screen display.

A display device according to an embodiment of the invention includes: a frame rate conversion section performing frame rate conversion through performing a frame interpolation process on a composite picture frame with use of a motion vector, the composite picture frame being generated through superimposing an OSD picture, i.e., on-screen display picture, on a picture frame; and a display section performing picture display based on a frame-rate-converted composite picture frame provided from the frame rate conversion section. The frame rate conversion section selectively performs the frame interpolation process to each pixel or to every plural pixels in the composite picture frame based on OSD region information indicating an OSD picture region.

A frame rate conversion device according to an embodiment of the invention includes: a frame rate conversion section performing frame rate conversion through performing a frame interpolation process on a composite picture frame with use of a motion vector, the composite picture frame being generated through superimposing an OSD picture, i.e., on-screen display picture, on a picture frame. The frame rate conversion section selectively performs the frame interpolation process to each pixel or to every plural pixels in the composite picture frame based on OSD region information indicating an OSD picture region.

A display method according to an embodiment of the invention includes the steps of: performing frame rate conversion through performing a frame interpolation process on a composite picture frame with use of a motion vector, the composite picture frame being generated through superimposing an OSD picture, i.e., on-screen display picture, on a picture frame, and the frame rate conversion being based on OSD region information indicating an OSD picture region; and performing picture display based on a frame-rate-converted composite picture frame.

With the display device, the frame rate conversion device, and the display method in the embodiments of the invention, the frame interpolation process based on the motion vector is performed on the composite picture frame generated through superimposing the OSD picture on the picture frame. The frame interpolation process is selectively performed to each pixel or to every plural pixels in the composite picture frame based on the OSD region information indicating the OSD picture region.

Advantageously, the OSD region information is a flag signal correlated with each pixel or with every plural pixels in the composite picture frame.

Advantageously, the OSD region information represents coordinates of the OSD picture region.

Advantageously, the display device further includes a superimposition section generating the OSD region information as well as the composite picture frame.

Advantageously, the frame rate conversion section performs the frame interpolation process to a region other than the OSD picture region in the composite picture frame.

Advantageously, the display device further includes a mask generation section generating a mask region based on the flag signal, and the frame rate conversion section performs the frame interpolation process to a region other than the mask region in the composite picture frame.

Advantageously, the mask region subsumes the OSD picture region.

Advantageously, the OSD picture region subsumes the mask region.

Advantageously, the mask generation section performs generation of the mask region with adjustment of a size thereof based on provided adjustment setting information.

Advantageously, the mask generation section generates the mask region configured of pixel blocks each including a plurality of pixels, and the frame rate conversion section selectively performs the frame interpolation process on each of the pixel blocks.

Advantageously, the mask generation section performs generation of the mask region with adjustment of a size thereof through comparing the number of OSD picture pixels included in each of the pixel blocks with a pixel-number threshold value.

Advantageously, the mask generation section determines to incorporate a pixel block into the mask region when that pixel block includes the number of OSD picture pixels same as a pixel-number of the pixel block.

Advantageously, the mask generation section determines to incorporate a pixel block into the mask region when that pixel block includes one or more OSD picture pixels.

Advantageously, the superimposition section multiplexes the composite picture frame and the OSD region information to output a resultant thereof.

Advantageously, the OSD region information is a flag signal correlated with each pixel or with every plural pixels in the composite picture frame, and the composite picture frame and the flag signal are subjected to time-divisional multiplexing for each pixel or for every plural pixels.

With the display device, the frame rate conversion device, and the display method in the embodiments of the invention, the frame interpolation process is selectively to each pixel or to every plural pixels in the composite picture frame based on the OSD region information indicating the OSD picture region. This accordingly reduces any picture error and noise resulting from the frame rate conversion in displaying of an on-screen display.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments and, together with the specification, serve to explain the principles of the invention.

DETAILED DESCRIPTION OF THE PREFERRED EMBODIMENTS

In the below, embodiments of the invention are described in detail by referring to the accompanying drawings. The description will be given in the following order.
1. First Embodiment
2. Second Embodiment
3. Third Embodiment
(1. First Embodiment)
(Exemplary Configuration)
(Exemplary Configuration in its Entirety)

Figure 1:
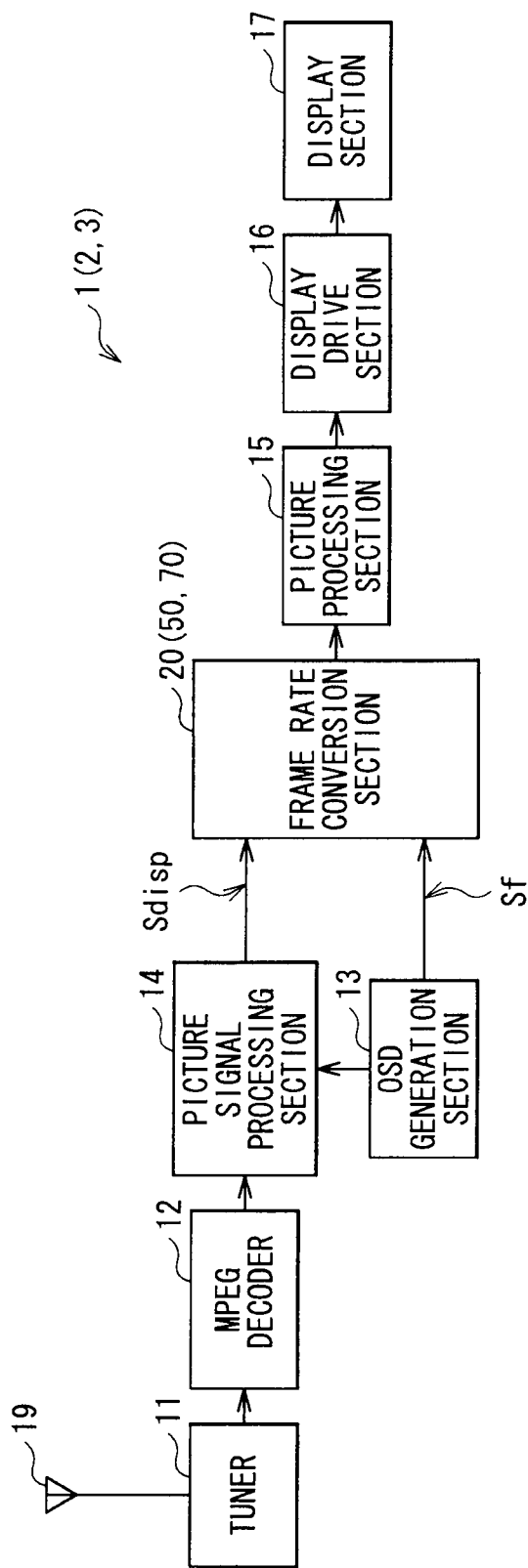
FIG. 1 is a block diagram showing an exemplary configuration of a display device in a first embodiment of the invention.

FIG. 1 is a diagram showing an exemplary configuration of a display device in a first embodiment of the invention. Note that a frame rate conversion device and a display method according to embodiments of the invention are embodied by this embodiment, and thus are described together herein.

A display device 1 includes a tuner 11, an MPEG (Moving Picture Experts Group) decoder 12, a picture signal processing section 14, an OSD generation section 13, a frame rate conversion section 20, a picture processing section 15, a display drive section 16, and a display section 17.

The tuner 11 is for selecting any desired signal, i.e., stream, from broadcast waves received by an antenna 19. The MPEG decoder 12 extracts a picture signal and an audio signal from the stream selected by the tuner 11.

The OSD generation section 13 is for generating an on-screen display for use with the setting of the display device 1. This OSD generation section 13 also has the function of generating an OSD flag signal Sf, which indicates in the display screen, in pixels, a screen region that displays the on-screen display.

The picture signal processing section 14 performs picture signal processing to the picture signal extracted by the MPEG decoder 12. This picture signal processing includes contrast enhancement, edge enhancement, interlace/progressive conversion, scaling (picture size change), and others. The picture signal processing section 14 also has the function of processing the resulting picture picture after the picture signal processing such that the on-screen display provided by the OSD generation section 13 is superimposed thereon. The picture signal processing section 14 then outputs the result of the processing as a picture signal Sdisp.

Figure 2:
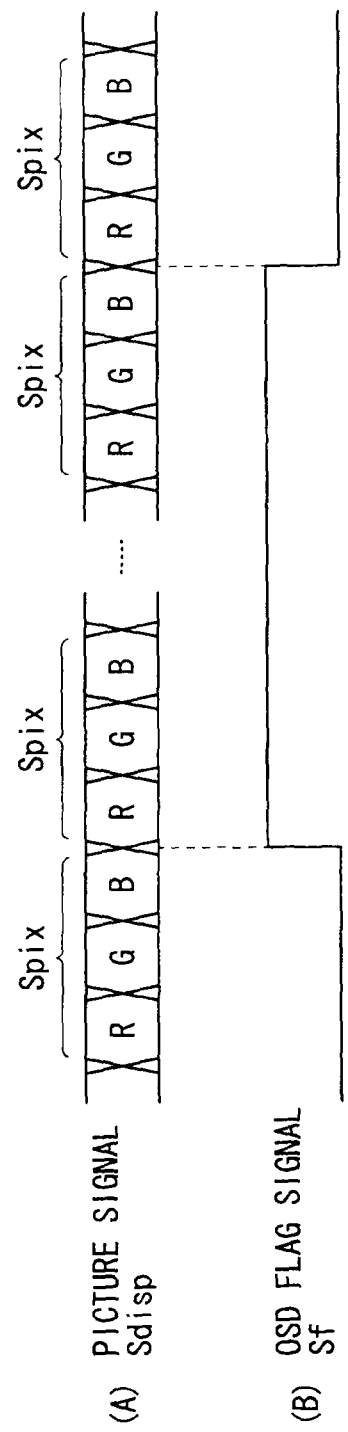
FIG. 2 is a timing chart of an exemplary OSD flag signal in the first embodiment of the invention.

FIG. 2 shows an exemplary OSD flag signal Sf. Specifically in FIG. 2, (A) shows the waveform of a picture signal Sdisp, and (B) shows the waveform of the OSD flag signal Sf. As shown in (A) in FIG. 2, the picture signal Sdisp includes pixel signals Spix each corresponding to a pixel. The pixel is the one including three sub pixels of red (R), green (G), and blue (B). In the picture signal Sdisp, the pixel signals Spix are arranged from the left end to the right end, and from the top line to the bottom line in the screen. The OSD flag signal Sf becomes active, i.e., becomes high in level in this example, at the timing of appearance of the pixel signals Spix corresponding to the pixels subjected to superimposition of an on-screen display.

The frame rate conversion section 20 is for performing frame rate conversion based on the picture signal Sdisp provided by the picture signal processing section 14. This frame rate conversion is performed such that the frame rate is increased from 60 frames per second to 120 frames per second or to 240 frames per second, for example. At the time of frame rate conversion as such, as will be described later, the frame rate conversion section 20 generates an interpolation frame(s) by performing a frame interpolation process (will be described later) only to a region outside of the screen region, i.e., an OSD mask region Rm that will be described later. This screen region is the one obtained based on the OSD flag signal Sf provided by the OSD generation section 13 as will be described later.

Figures 3A, 3B:
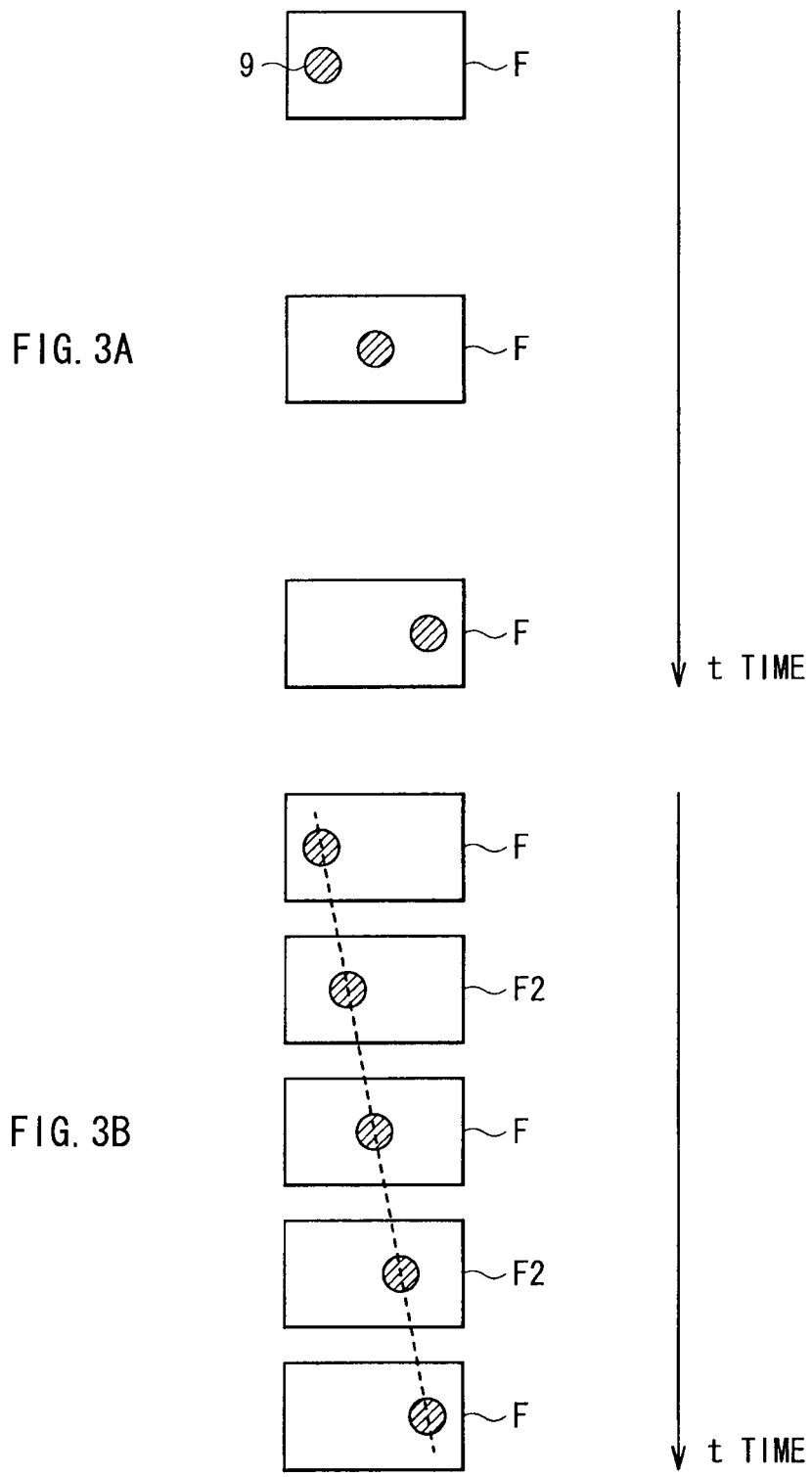
FIGS. 3A and 3B are each a schematic diagram for illustrating exemplary frame rate conversion by a frame rate conversion section in the first embodiment of the invention.

FIGS. 3A and 3B are diagrams each schematically showing the frame rate conversion. Specifically, FIG. 3A shows picture before the frame rate conversion, and FIG. 3B shows picture after the frame rate conversion. In this example, the frame rate is converted to be twice what it is before the frame rate conversion. For the frame rate conversion in this example, an interpolation frame F2 is generated based on image information on each two frames F temporally adjacent to each other, and the resulting interpolation frame F2 is inserted between these two frames F. As shown in FIG. 3A, with picture with which a ball 9 moves from left to right in the frames F, for example, interpolating the interpolation frame F2 between each two adjacent frames F makes smoother the movement of the ball 9 as shown in FIG. 3B. If the display section 17 (will be described later) includes liquid crystals, for example, this results in the so-called motion blurring that is caused by pixels remaining in the same state for the duration of a frame. However, interpolating the interpolation frames F2 as above may reduce the influence to be exerted by the motion blurring.

The picture processing section 15 has the function of performing predetermined picture processing to the picture signal as a result of the frame rate conversion by the frame rate conversion section 20. The predetermined picture processing includes gamma processing, overdrive processing, and others. The display drive section 16 is for driving the display section 17 based on picture information coming from the picture processing section 15. The display section 17 uses as a basis a signal coming from the display drive section 16 for display.

(Frame Rate Conversion Section 20)

Figure 4:
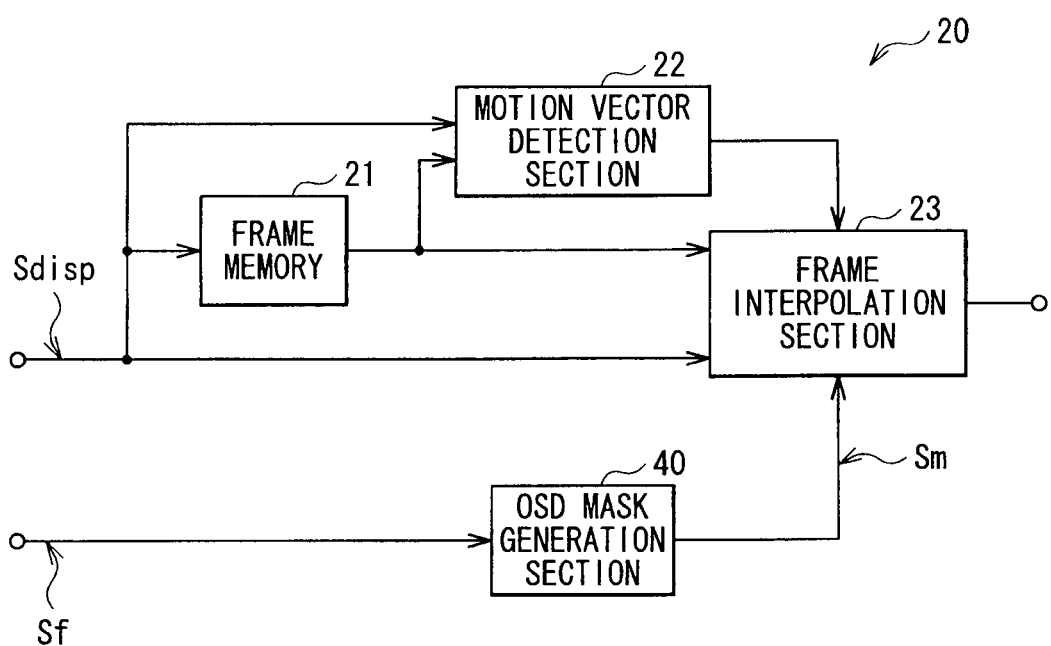
FIG. 4 is a block diagram showing an exemplary configuration of the frame rate conversion section in the first embodiment.

FIG. 4 shows an exemplary configuration of the frame rate conversion section 20. The frame rate conversion section 20 includes a frame memory 21, a motion vector detection section 22, a frame interpolation section 23, and an OSD mask generation section 40.

The frame memory 21 has the function of retaining the image of a frame in an incoming picture signal Sdisp, thereby outputting information on the preceding frame.

The motion vector detection section 22 is for detecting motion vectors indicating any change of images (will be described later). For the detection as such, the motion vector detection section 22 uses as a basis the image of a frame in the picture signal Sdisp and the image of the preceding frame provided by the frame memory 21. The frame interpolation section 23 is for interpolation of the image information of such two frames F, i.e., for performing a frame interpolation process, based on the motion vectors provided by the motion vector detection section 22. At the time of frame interpolation as such, the frame interpolation section 23 performs the frame interpolation process only to a portion outside of an OSD mask region Rm, which is indicated by an incoming OSD mask signal Sm as will be described later. The frame interpolation section 23 also has the function of generating an interpolation frame F2 based on the frame interpolation process as such, and inserting the resulting interpolation frame F2 between the corresponding two frames F.

Figure 5A:
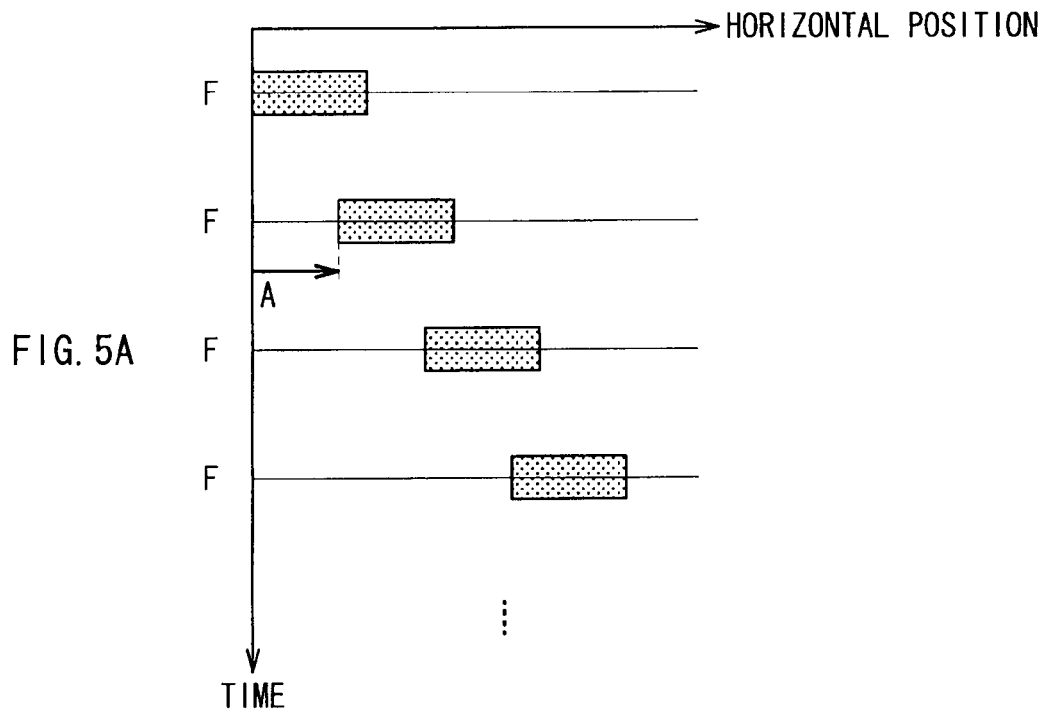
FIGS. 5A and 5B are each a schematic diagram illustrating an exemplary operation of a motion vector detection section and that of a frame interpolation section in the first embodiment.
Figure 5B:
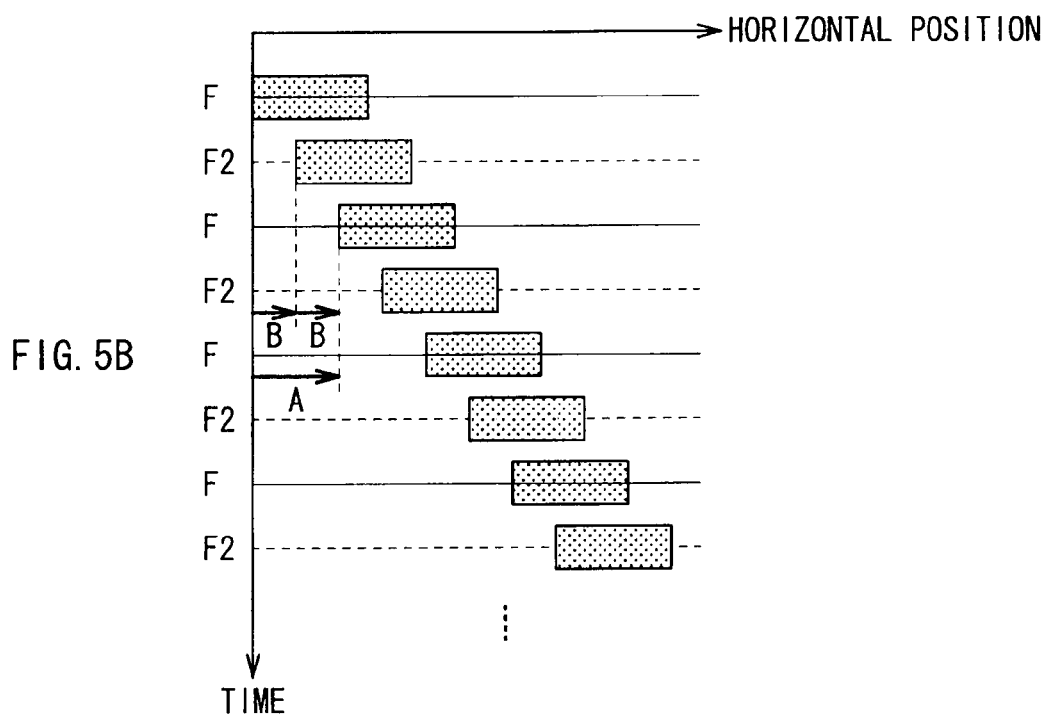

FIGS. 5A and 5B are diagrams each schematically showing an exemplary operation of the motion vector detection section 22 and that of the fame interpolation section 23. Specifically, FIG. 5A shows the state before the frame interpolation, and FIG. 5B shows the state after the frame interpolation. In FIGS. 5A and 5B, the horizontal axis indicates the horizontal position on the screen, and the vertical axis indicates the time.

As shown in FIG. 5A, the motion vector detection section 22 detects the movement of display content in pixels based on the information of the provided two frames F, thereby obtaining a motion vector A in the horizontal direction. Alternatively, as will be described in a second embodiment below, the movement of the display content may be detected in blocks each including a plurality of pixels. As shown in FIG. 5B, the frame interpolation section 23 then generates a vector B from the motion vector A provided by the motion vector detection section 22. The vector B is a half of the motion vector A, and the frame interpolation section 23 interpolates the image information in pixels, i.e., performs the frame interpolation process.

Although described above is the movement of the display content in the horizontal direction, the movement of the display content in the vertical direction is similar. That is, the motion vector detection section 22 obtains a motion vector A each in the horizontal and vertical directions, and based on the resulting motion vectors A, the frame interpolation section 23 performs the frame interpolation process to generate an interpolation frame F2 for insertion between the corresponding two frames F. As such, the frame rate conversion section 20 performs the frame rate conversion.

Note here that the frame rate conversion is generally known by 2:3 pull-down or 2:2 pull-down, for example. The basic operational principles of these methods are the same as those of the method described above.

The OSD mask generation section 40 is for generating an OSD mask signal Sm based on the OSD flag signal Sf provided by the OSD generation section 13. To be specific, the OSD mask generation section 40 is for generating, to the frame interpolation section 23, an OSD mask region Rm that is a screen region in which the frame interpolation process is not performed, as will be described later. Such an OSD mask region Rm is generated based on an OSD flag region Rf being a screen region of the on-screen display. Herein, the OSD flag region Rf indicates the position (region) of any pixel where the OSD flag signal Sf is being active. That is, the OSD flag region Rf indicates a region of the on-screen display on the screen. Similarly, the OSD mask region Rm indicates the position of any pixel where the OSD mask signal Sm is being active.

Figure 6:
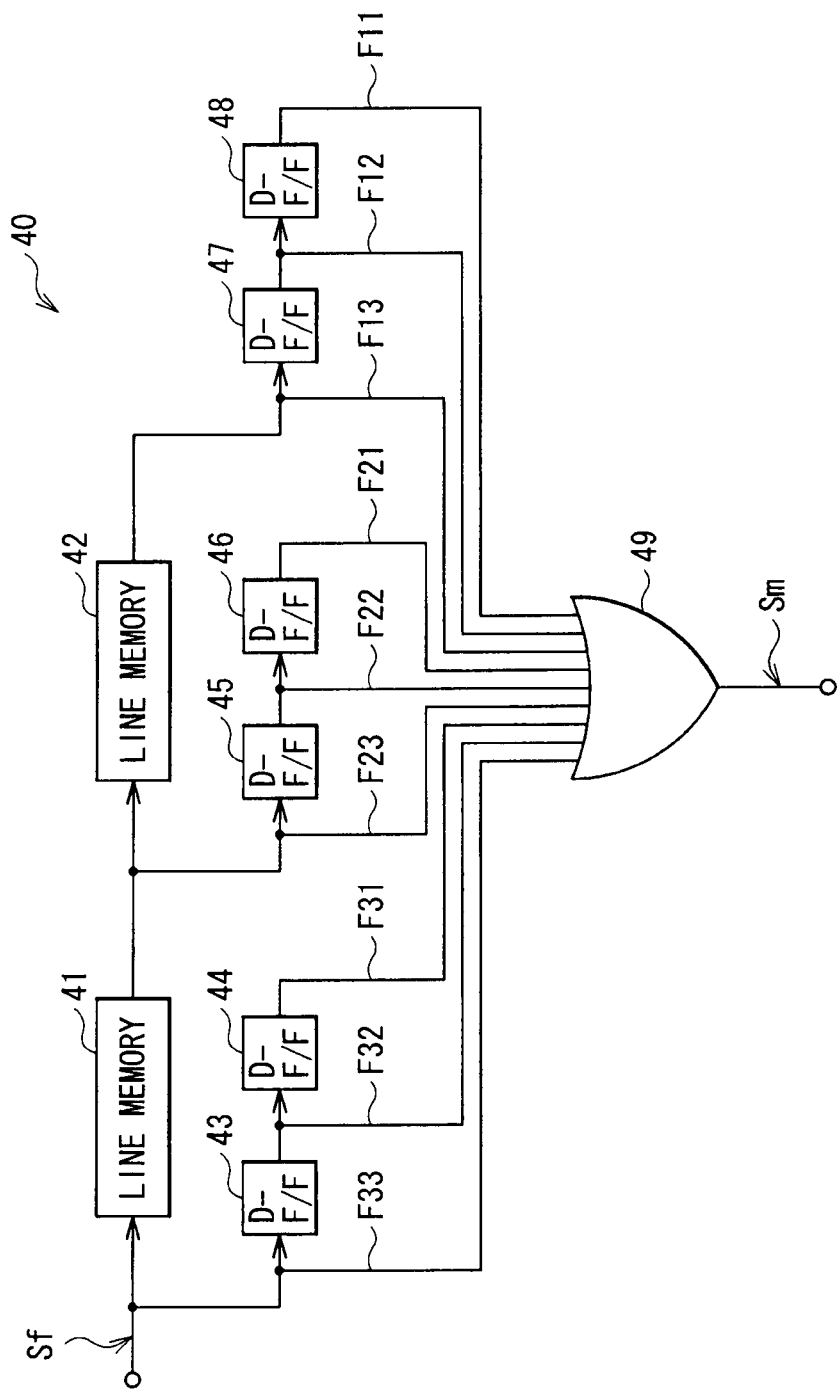
FIG. 6 is a block diagram showing an exemplary configuration of an OSD mask generation section in the first embodiment.

FIG. 6 is a diagram showing an exemplary configuration of the OSD mask generation section 40. The OSD mask generation section 40 includes line memories 41 and 42, D-type flip-flops 43 to 48, and an OR circuit 49.

The line memories 41 and 42 each have the function of retaining information on an input signal of one line, thereby outputting information that precedes by one line. In the line memory 41, the input terminal is provided with the OSD flag signal Sf such that the line memory 41 outputs information on the provided OSD flag signal Sf that precedes by one line. In the line memory 42, the input terminal is connected to the output terminal of the line memory 41 such that the line memory 42 outputs information on the provided OSD flag signal Sf that precedes by two line.

The D-type flip-flops 43 to 48 each have the function of retaining information on an input signal of one pixel, thereby outputting information that precedes by one pixel. In the D-type flip-flop 43, the input terminal is provided with the OSD flag signal Sf, and in the D-type flip-flop 44, the input terminal is connected to the output terminal of the D-type flip-flop 43. In the D-type flip-flop 45, the input terminal is connected with the output terminal of the line memory 41, and in the D-type flip-flop 46, the input terminal is connected to the output terminal of the D-type flip-flop 45. In the D-type flip-flop 47, the input terminal is connected with the output terminal of the line memory 42, and in the D-type flip-flop 48, the input terminal is connected to the output terminal of the D-type flip-flop 47.

The OR circuit 49 is for obtaining OR of the input signal. The input of the OR circuit 49 is connected to the input terminal of the OSD mask generation section 40 where the OSD flag signal Sf is provided, to the output terminals of the line memories 41 and 42, and to the output terminals of the D-type flip-flops 43 to 48.

With the OSD mask generation section 40 configured as such, as will be described later, the OSD mask region Rm generated thereby is larger than the OSD flag region Rf indicated by the OSD flag signal Sf on the screen, i.e., larger by one pixel in both the horizontal and vertical directions. The OSD mask generation section 40 then provides the resulting OSD mask region Rm to the frame interpolation section 23 as an OSD mask signal Sm.

Figure 7:
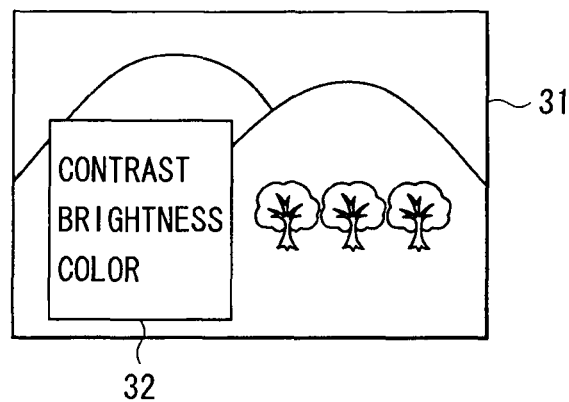
FIG. 7 is a diagram showing an exemplary display screen of the display device in the first embodiment of the invention.

FIG. 7 is a diagram showing an exemplary display screen of the display section 17. In this example, the display section 17 displays on its display screen 31 an on-screen display 32. The image displayed on the display screen 31 is subjected to the frame interpolation process only to the outside portion of the OSD mask region Rm obtained by the OSD mask generation section 40 based on the OSD flag region Rf indicating the screen region of the on-screen display 32. In other words, the OSD mask region Rm is not subjected to the frame interpolation process. As such, the screen region corresponding to the on-screen display 32 becomes free from picture error and noise to be caused by the frame interpolation process as will be described later.

The display device 1 is a specific example of a "display device" in one embodiment of the invention. The OSD flag signal Sf is a specific example of a "flag signal" in one embodiment of the invention. The OSD generation section 13 and the picture signal processing section 14 are a specific example of a "superimposition section" in one embodiment of the invention. The OSD mask generation section 40 is a specific example of a "mask generation section" in one embodiment of the invention. The OSD mask region Rm is a specific example of a "mask region" in one embodiment of the invention.

(Operation and Effects)

Described next are the operation and effects of the display device 1 in the embodiment.

(Outline of Entire Operation)

The tuner 11 selects any desired signal, i.e., stream, from broadcasting waves received by the antenna 19. From the stream selected by the tuner 11, the MPEG decoder 12 extracts a picture signal and an audio signal. The OSD generation section 13 generates an on-screen display, and generates an OSD flag signal Sf. The picture signal processing section 14 performs predetermined picture signal processing to the picture signal extracted by the MPEG decoder 12, and superimposes thereon the on-screen display provided by the OSD generation section 13.

In the frame rate conversion section 20, the OSD mask generation section 40 generates an OSD mask signal Sm, i.e., an OSD mask region Rm, based on an OSD flag signal Sf, i.e., an OSD flag region Rf. The frame memory 21 outputs information on an incoming picture signal Sdisp of the preceding frame. The motion vector detection section 22 detects a motion vector A based on the information of the provided two frames. The frame interpolation section 23 performs a frame interpolation process to the screen region outside of the OSD mask region Rm based on the motion vector A. The frame interpolation section 23 generates thereby an interpolation frame F2, and inserts the interpolation frame F2 between the provided two frames F.

The picture processing section 15 performs predetermined picture processing to the picture signal provided by the frame rate conversion section 20. The display drive section 16 drives the display section 17 based on the picture information provided by the picture processing section 15. The display section 17 uses as a basis a drive signal coming from the display drive section 16 for display.

(Detailed Operation)

By referring to several drawings, described next is the detailed operation of the OSD mask generation section 40.

Figure 8:
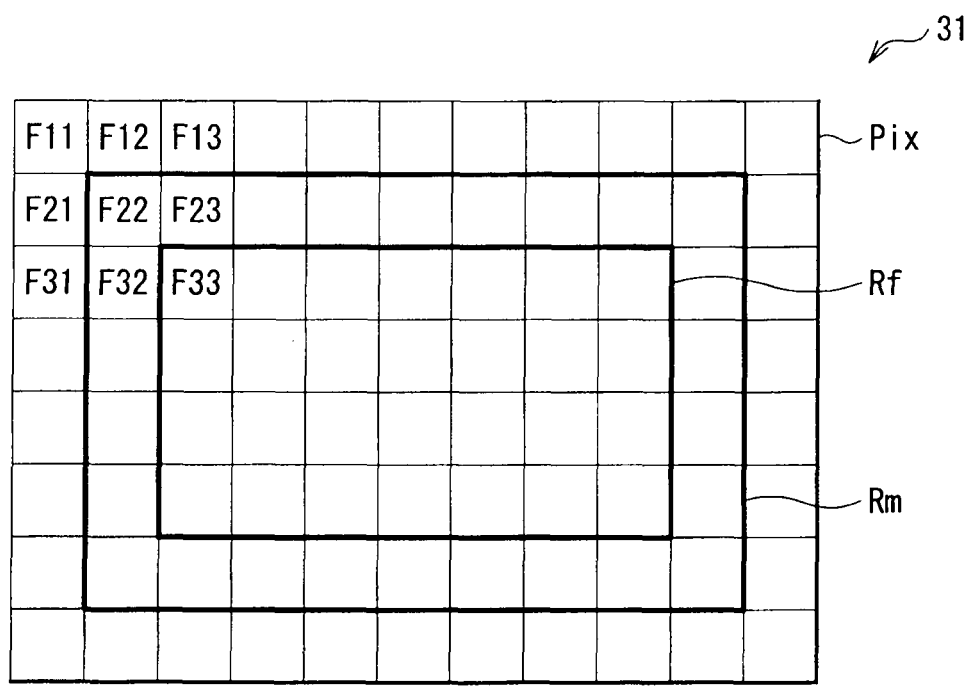
FIG. 8 is a schematic diagram illustrating an exemplary operation of the OSD mask generation section in the first embodiment.

FIG. 8 is a diagram schematically showing an exemplary operation of the OSD mask generation section 40. FIG. 8 shows a part of the display screen 31 together with the OSD flag region Rf and the OSD mask region Rm. In the display screen 31, a plurality of pixels Pix are arranged in a matrix.

The OSD flag region Rf indicates, in the screen, the position (region) of any pixel Pix where the OSD flag signal Sf to be input to the OSD mask generation section 40 is being active. That is, in FIG. 8, the inside portion of the OSD flag region Rf indicates the pixels Pix where the OSD flag signal Sf is active. In other words, the OSD flag region Rf indicates the region of the on-screen display 32.

Figure 9:
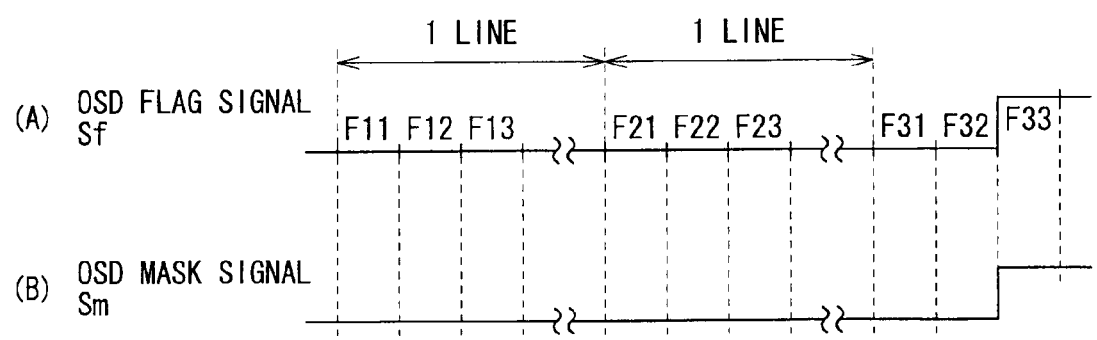
FIG. 9 is a timing chart of an exemplary operation of the OSD mask generation section in the first embodiment.

FIG. 9 shows an exemplary operation of the OSD mask generation section 40. In FIG. 9, (A) shows the waveform of the OSD flag signal Sf, and (B) shows the waveform of the OSD mask signal Sm. In this example, the OSD flag signal Sf includes signals F11 to F13, F21 to F23, and F31 to F33. The signals F11 to F13 and the signals F21 to F23 are respectively away from each other on the display screen by one line, and the signals F21 to F23 and the signals F31 to F33 are respectively away from each other thereon by one line. In this example, the signals F11 to F13, F21 to F23, and F31 to F32 are all low in level, and the signal F33 is high in level, i.e., is active. These signals are corresponding to the signals of FIG. 8, i.e., the signals F11 to F13, F21 to F23, and F31 to F33. That is, in FIG. 9, the signals where the OSD flag signal Sf is low in level, i.e., the signals F11 to F13, F21 to F23, and F31 and F32, are located outside of the OSD flag region Rf in FIG. 8, and in FIG. 9, the signal F33 where the OSD flag signal Sf is high in level, i.e., is active, is located inside of the OSD flag region Rf in FIG. 8.

When the OSD flag signal Sf in (A) in FIG. 9 is input to the OSD mask generation section 40, the input of the OR circuit 49 in the OSD mask generation section 40 is in the state of FIG. 6 when the OSD flag signal Sf is the signal F33. That is, the signal F33, i.e., the OSD flag signal Sf, is inputted to one of the inputs to the OR circuit 49, and the remaining inputs of the OR circuit 49 are respectively provided with the signals low in level, i.e., the signals F11 to F13, F21 to F23, F31, and F32, coming from the line memories 41 and 42 and the D-type flip-flops 43 to 48. At this time, the output of the OR circuit 49 becomes high in level, i.e., becomes active, and as shown in (B) in FIG. 9, the OSD mask generation section 40 outputs the OSD mask signal Sm high in level, i.e., being active. After receiving the OSD mask signal Sm, the frame interpolation section 23 determines that the OSD mask signal Sm at the position of the signal F22 becomes active. The signal F22 is the one located at the center of the signals F11 to F13, F21 to F23, and F31 to F33 in FIG. 8. As such, the pixel Pix where the OSD mask signal Sm is active is the OSD mask region Rm as shown in FIG. 8.

By repeatedly performing such an operation to the display screen 31 in its entirety, as shown in FIG. 8, the OSD mask generation section 40 generates the OSD mask region Rm larger by one pixel than the OSD flag region Rf in both the horizontal and vertical directions. That is, this OSD mask generation section 40 generates the OSD mask region Rm, which is larger by one pixel than the on-screen display 32 in both the horizontal and vertical directions.

The frame interpolation section 23 performs the frame interpolation process based on this OSD mask region Rm. That is, the frame interpolation section 23 performs the frame interpolation process only to the outside portion of the OSD mask region Rm, but not to the inside portion of the OSD mask region Rm. As such, the inside of the OSD mask region Rm becomes free from picture error and noise resulting from the frame interpolation process. Even if any error occurs inside of the OSD mask region Rm during the frame interpolation process due to a scheme of the frame interpolation section 23, because the frame interpolation section 23 performs the frame interpolation process based on the OSD mask region Rm larger than the on-screen display 32, compared with the case of performing the frame interpolation process based on the OSD flag region Rf, i.e., based on the region of the on-screen display 32, the occurrence of error can be reduced in the on-screen display 32.

Also, in general, in a frame interpolation process based on motion vectors, on a boundary and therearound between image regions in which display contents move differently, the motion vectors are easily affected by pixels located around the boundary. The resulting vector error may cause a frame interpolation having an error on the boundary and therearound between the image regions where the display contents move differently. To be specific, when an on-screen display being a still image is superimposed on moving images, the boundary and therearound between the on-screen image and the moving images is susceptible to errors. In this embodiment, the on-screen display becomes less susceptible to such errors by increasing the size of the OSD mask region Rm compared with the OSD flag region Rf.

(Effects)

As such, in the embodiment, the OSD flag signal Sf designates the region of an on-screen display to perform the frame interpolation process selectively. The frame interpolation process is thus performed only to the outside portion of the on-screen display, thereby reducing any picture error and noise to be caused by the frame rate conversion.

Further, in the embodiment, the OSD flag signal Sf designates the region of an on-screen display on a pixel basis. Accordingly, even if the on-screen display is complex in shape, or even if the on-screen display is in motion, the frame interpolation process can be accordingly performed to the outside portion of the on-screen display. To be specific, the frame interpolation process can be performed in accordance with the shape of the on-screen display, e.g., when the on-screen display is not rectangular or is complex in shape, when the on-screen display is frameless and includes only text, or when the on-screen display is in motion like sliding in from the side.

Still further, in this embodiment, the frame interpolation process is performed based on the OSD mask signal Sm generated based on the OSD flag signal Sf. The setting can be thus made not to perform the frame interpolation process to any region not the on-screen display. Especially when the OSD mask region Rm is made larger than the OSD flag region Rf, the on-screen display can be less susceptible to the influence to be exerted by errors occurred to the outer edge of the on-screen display and therearound. Even if the frame interpolation process causes errors inside of the OSD mask region Rm, it is possible to reduce the influence of the errors on the on-screen display.

MODIFIED EXAMPLE 1-1

In the above embodiment, exemplified is the case that the OSD mask generation section 40 generates the OSD mask region Rm larger by one pixel than the OSD flag region Rf in both the horizontal and vertical directions. This is surely not restrictive, and alternatively, the OSD mask generation section 40 may generate the OSD mask region Rm larger by two pixels or more in both the horizontal and vertical directions, or may generate the OSD mask region Rm smaller by one pixel or more in both the horizontal and vertical directions. Still alternatively, the OSD mask generation section 40 may vary the number of pixels between the horizontal and vertical directions for size increase of the OSD mask region Rm. In the below, several cases are exemplified.

Figure 10:
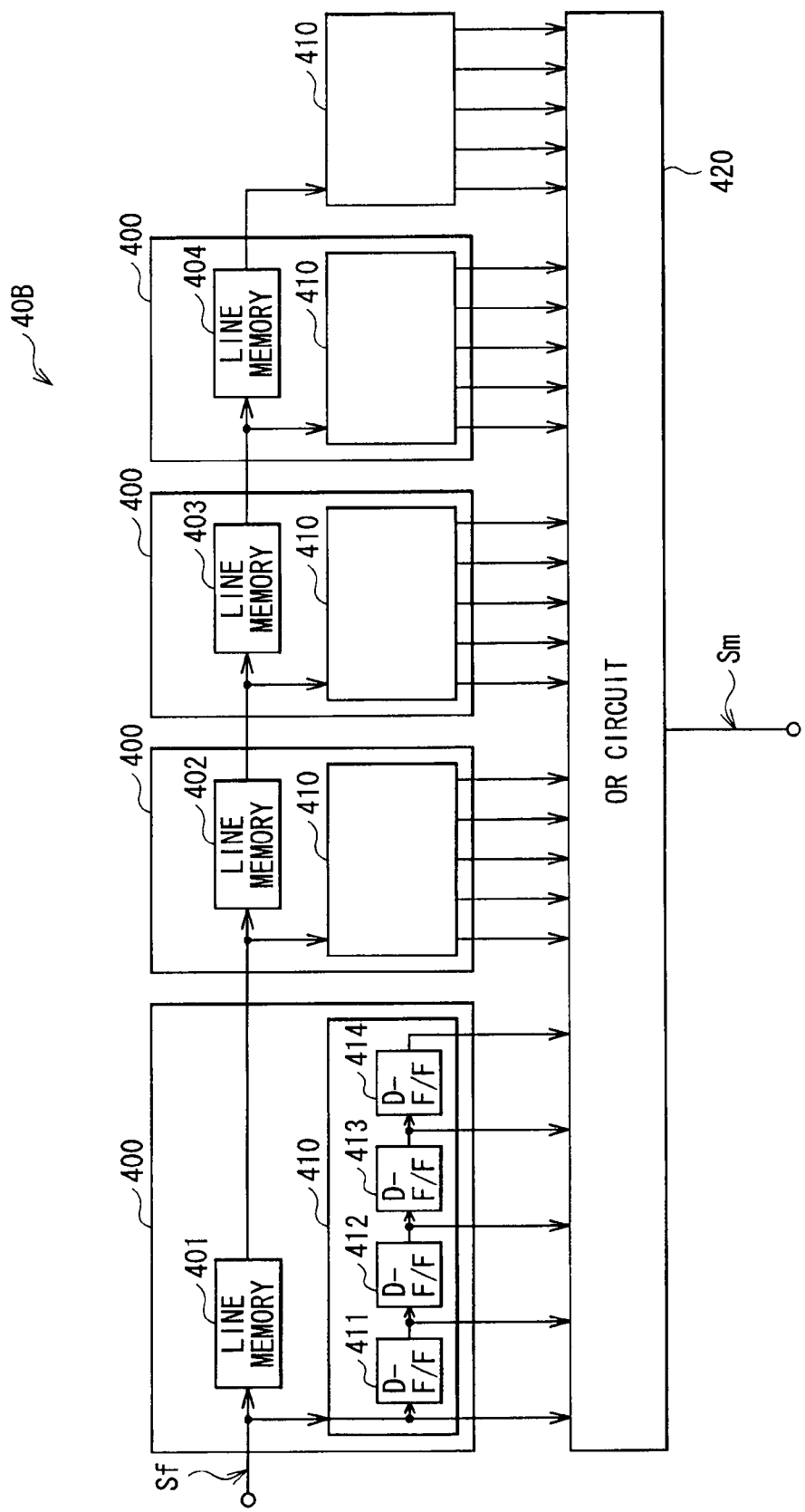
FIG. 10 is a block diagram showing an exemplary configuration of an OSD mask generation section in a modified example of the first embodiment.

FIG. 10 is a diagram showing an exemplary configuration of an OSD mask generation section 40B that generates an OSD mask region Rm, which is larger by two pixels than an OSD flag region Rf in both the horizontal and vertical directions. Compared with the OSD mask generation section 40 of the embodiment above, the OSD mask generation section 40B in this modified example includes a larger number of D-type flip-flops for connections to line memories 401 to 404, and a larger number of memory blocks 400. The memory blocks 400 are each configured by a line memory, and a D-type flip flop connected to the input thereof. With a larger number of D-type flip-flops for connections to the line memories as such, the OSD mask region Rm to be generated by the OSD mask generation section 40B is larger than the OSD flag region Rf in the horizontal direction. Moreover, with a larger number of memory blocks 400 as such, the OSD mask region Rm to be generated by the OSD mask generation section 40B is larger than the OSD flag region Rf in the vertical direction. As such, it is also possible to vary the number of pixels between the horizontal and vertical direction for size increase of the OSD mask region Rm.

With the OSD mask region Rm being larger than the OSD flag region Rf as such, the on-screen display can be less insusceptible to the influence of errors to be caused at the outer edge of the on-screen display and therearound. Moreover, even if the frame interpolation process causes errors inside of the OSD mask region, it is possible to reduce the influence of the errors on the on-screen display.

Figure 11:
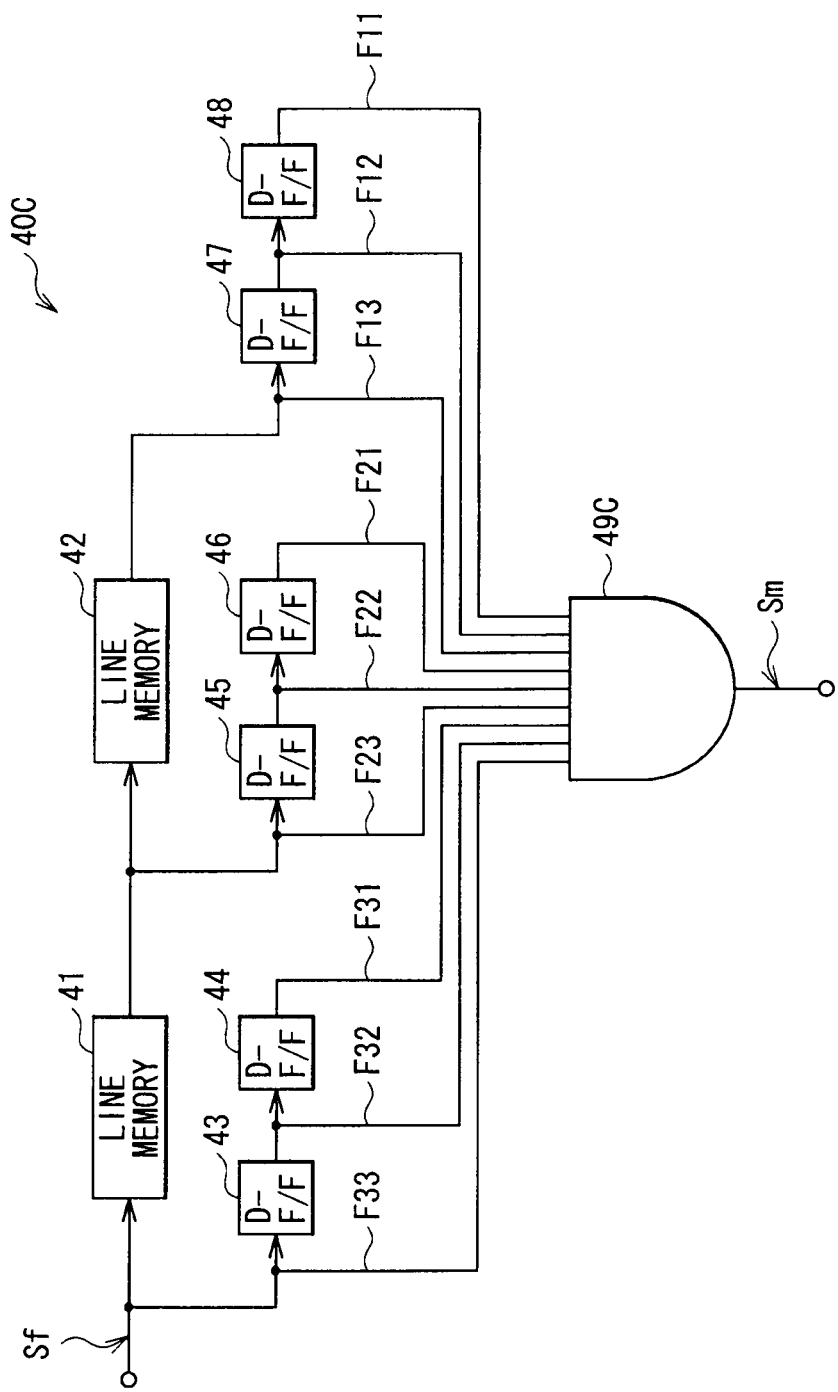
FIG. 11 is a block diagram showing an exemplary configuration of an OSD mask generation section in another modified example of the first embodiment.
Figure 12:
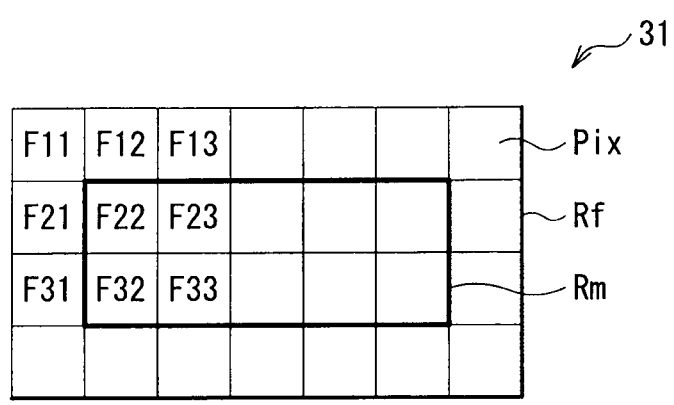
FIG. 12 is a schematic diagram illustrating an exemplary operation of the OSD mask generation section in the modified example of the first embodiment.

FIG. 11 is a diagram showing an exemplary configuration of an OSD mask generation section 40C that generates an OSD mask region Rm, which is smaller by one pixel than an OSD flag region Rf in both the horizontal and vertical directions. Compared with the OSD mask generation section 40 of the embodiment above, the OSD mask generation section 40C includes an AND circuit 49C as an alternative to the OR circuit 49. With such a configuration, the OSD mask region Rm to be generated by the OSD mask generation section 40C is smaller than the on-screen display, i.e., the OSD flag region Rf, as shown in FIG. 12.

MODIFIED EXAMPLE 1-2

Figure 13:
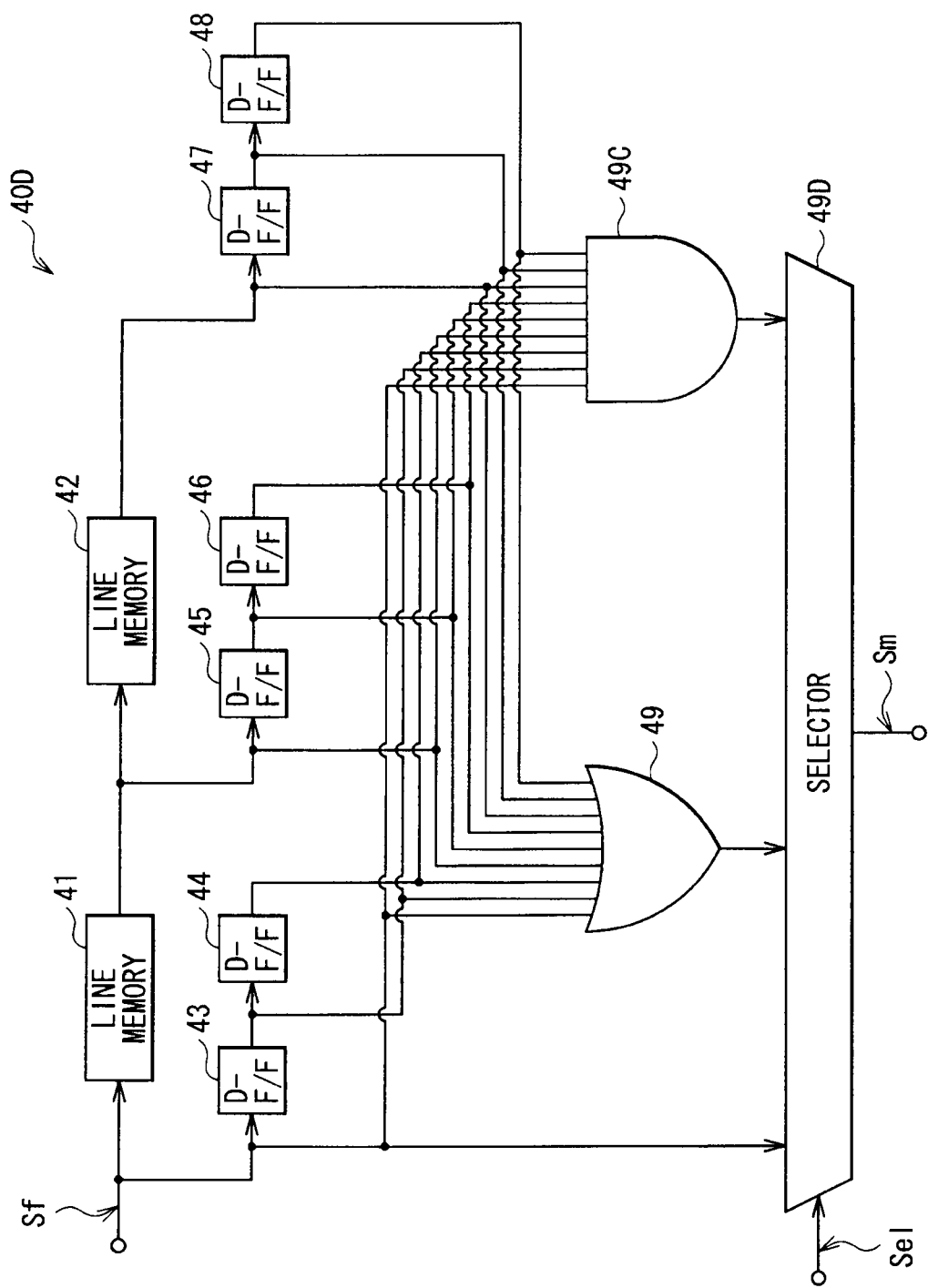
FIG. 13 is a block diagram showing an exemplary configuration of an OSD mask generation section in still another modified example of the first embodiment.

In the first embodiment above, the OSD mask generation section 40 is exemplified as always generating the OSD mask region Rm larger by one pixel than the OSD flag region Rf in both the horizontal and vertical directions. This is surely not restrictive, and alternatively, the OSD mask generation section 40 may change the OSD mask region Rm through setting from the outside. FIG. 13 is a diagram showing an exemplary configuration of an OSD mask generation section 40D in this modified example. The OSD mask generation section 40D includes the OSD mask generation section 40 of FIG. 6 in the above embodiment, and the OSD mask generation section 40C of FIG. 11 in the above modified example. The OSD mask generation section 40D is also provided with a selector 49D. The selector 49D is for selecting any one of three input signals based on a control signal Se1 coming from the outside, and outputs the selected signal as an OSD mask signal Sm. The three input signals include an OSD flag signal Sf, an output signal from the OR circuit 49, and the output signal from the AND circuit 49C. That is, when selecting the OSD flag signal Sf as an input, the selector 49D outputs an OSD mask signal Sm indicating an OSD mask region Rm equal to an OSD flag region Rf. Further, when selecting the output signal from the OR circuit 49 as an input, similarly to the OSD mask generation section 40 of FIG. 6 in the above embodiment, the selector 49D outputs an OSD mask signal Sm indicating an OSD mask region Rm larger by one pixel than an OSD flag region Rf in both the horizontal and vertical directions. Still further, when selecting the output signal from the AND circuit 49C as an input, similarly to the OSD mask generation section 40C of FIG. 11 in the above modified example, the selector 49D outputs an OSD mask signal Sm indicating an OSD mask region Rm smaller by one pixel than the OSD flag region Rf in both the horizontal and vertical directions.

Herein, the control signal Se1 is a specific example of "adjustment setting information" in one embodiment of the invention.

When the OSD mask region Rm is made larger than the on-screen display, although the on-screen display may look awkward with the conspicuous edge thereof, i.e., the boundary between the outside portion of the OSD mask region Rm (the portion for the frame interpolation process) and the inside portion thereof (the portion not for the frame interpolation process), the errors occurring thereto are reduced in the on-screen display and therearound. On the other hand, when the OSD mask region Rm is made smaller than the on-screen display, because the frame interpolation process may be performed to the end portions of the on-screen display, the outer edge portion as such may suffer from errors but the above-described awkwardly conspicuous edge of the on-screen display can be improved. That is, these two are in the relationship of trade-off. As described in this modified example, using a control signal Se1 allows such a size selection.

MODIFIED EXAMPLE 1-3

In the above embodiment, the OSD generation section 13 provides an OSD flag signal Sf to the frame rate conversion section 20 separately from the picture signal processing section 14 providing a picture signal Sdisp thereto. This is surely not restrictive, and alternatively, the OSD flag signal Sf and the picture signal Sdisp may be multiplexed for a supply. In the below, an example is described.

Figure 14:
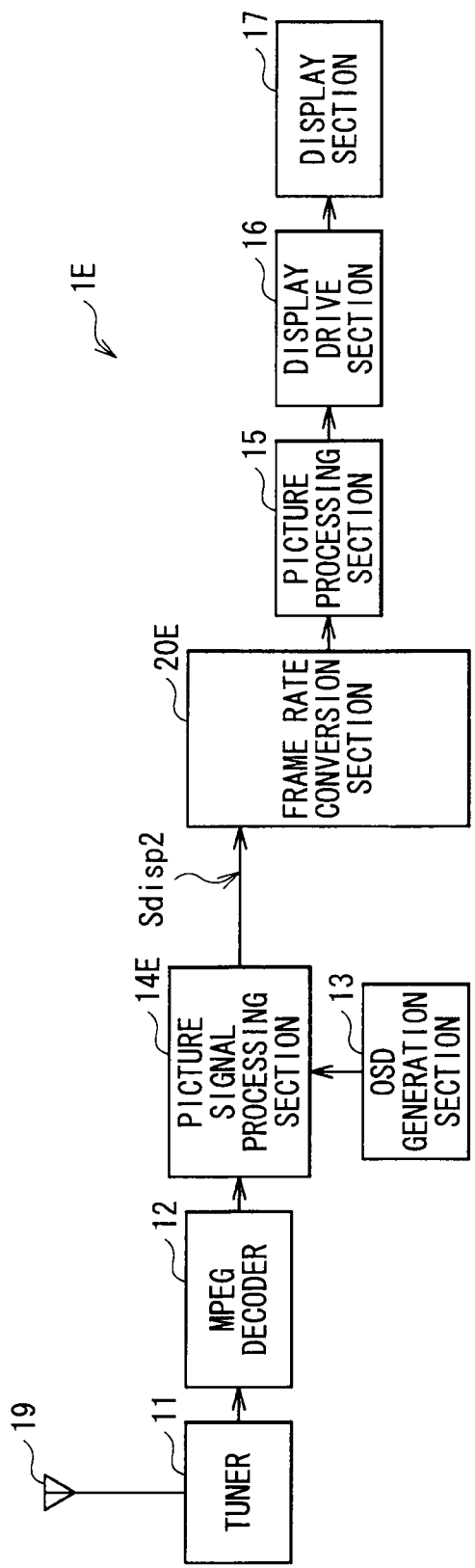
FIG. 14 is a block diagram showing an exemplary configuration of a display device in still another modified example of the first embodiment.

FIG. 14 is a diagram showing an exemplary configuration of a display device 1E in this modified example. The display device 1E includes a picture signal processing section 14E, and a frame rate conversion section 20E.

Figure 15:
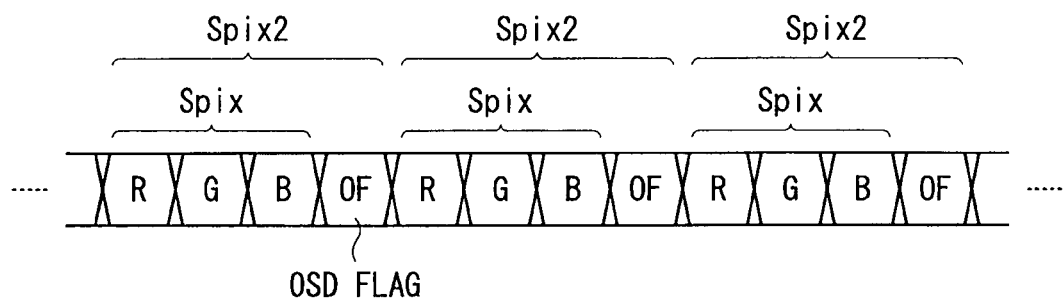
FIG. 15 is a waveform diagram of an exemplary OSD-flag-provided picture signal in the modified example of the first embodiment.

The picture signal processing section 14E generates an OSD-flag-provided picture signal Sdisp2, and provides the picture signal to the frame rate conversion section 20E. This OSD-flag-provided picture signal Sdisp2 is the result of multiplexing the picture signal and the OSD flag signal. FIG. 15 is a diagram showing an exemplary OSD-flag-provided picture signal Sdisp2. The OSD-flag-provided picture signal Sdisp2 includes an OSD-flag-provided pixel signal Spix2. The OSD-flag-provided pixel signal Spix2 is configured by a pixel signal Spix, and an OSD flag OF corresponding to the pixel of the pixel signal Spix.

Figure 16:
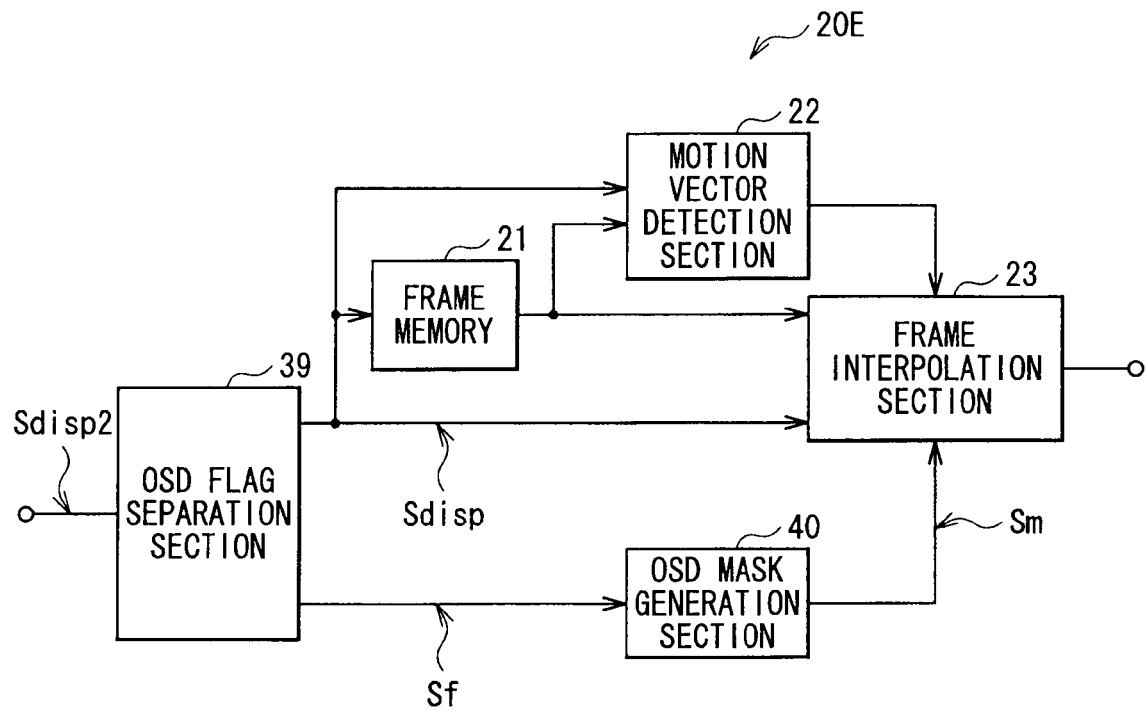
FIG. 16 is a block diagram showing an exemplary configuration of an OSD mask generation section in the modified example of the first embodiment.

The frame rate conversion section 20E is for performing frame rate conversion based on the OSD-flag-provided picture signal Sdisp2 provided by the picture signal processing section 14E. FIG. 16 is a diagram showing an exemplary configuration of the frame rate conversion section 20E. The frame rate conversion section 20E includes an OSD flag separation section 39. The OSD flag separation section 39 is for separating, from the OSD-flag-provided picture signal Sdisp2 of FIG. 15, the pixel signal Spix and the OSD flag OF, thereby generating the picture signal Sdisp and the OSD flag signal Sf of FIG. 2.

By multiplexing the OSD flag signal Sf and the picture signal Sdisp as such, the synchronization between those signals can be established easily, and the signal transmission to the frame rate conversion section 20E can be performed simply.

MODIFIED EXAMPLE 1-4

Figure 17:
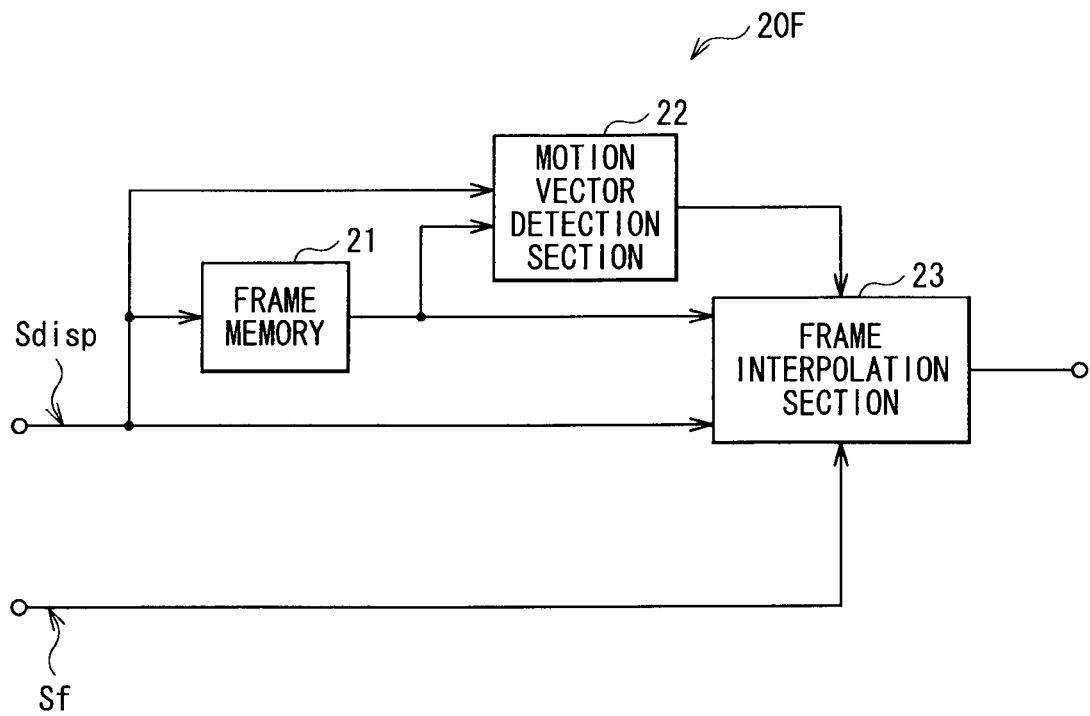
FIG. 17 is a block diagram showing an exemplary configuration of an OSD mask generation section in still another example of the first embodiment.

In the above embodiment, the OSD generation section 13 generates an OSD flag signal Sf. This is surely not restrictive, and alternatively, the OSD generation section 13 may generate an OSD mask signal Sm, for example. FIG. 17 is a diagram showing an exemplary configuration of a frame rate conversion section 20F in this modified example. The frame rate conversion section 20F is for performing frame rate conversion based on an OSD mask signal Sm coming from an OSD generation section (not shown) in this modified example. The frame rate conversion section 20F in this modified example is configured similarly to the frame rate conversion section 20 (FIG. 4) in the above embodiment but not including the OSD mask generation section 40. In this case, similarly to the modified example 1-3 described above, the OSD mask signal Sm may be multiplexed with a picture signal Sdisp.

MODIFIED EXAMPLE 1-5

In the above embodiment, the frame interpolation section 23 is described as performing the frame interpolation process based on the OSD mask signal Sm. This is surely not restrictive, and alternatively, the OSD mask generation section 40 may not be provided, and the frame interpolation section 23 may perform the frame interpolation process based on an OSD flag signal Sf.

MODIFIED EXAMPLE 1-6

In the above embodiment, the picture signal Sdisp is configured by serial data including signals of RGB sub pixels. This is surely not restrictive, and alternatively, the picture signal Sdisp may be parallel data each including a signal of RGB sub pixels.

(2. Second Embodiment)

Described next is a display device 2 according to a second embodiment of the invention. In this second embodiment, the frame rate conversion section performs the frame rate conversion differently from that in the first embodiment described above. That is, in the first embodiment above (FIG. 4), the motion vector detection section 22 and the frame interpolation section 23 obtain motion vectors on a pixel basis to perform the frame interpolation process. On the other hand, in this second embodiment, the motion vectors are obtained on a block basis to perform the frame interpolation process. The block is the one including a plurality of pixels. The display device 2 is configured similarly to the display device 1 (FIG. 1) in the first embodiment above except for the frame rate conversion section. Note here that any component substantially the same as that in the display device 1 in the above first embodiment is provided with the same reference numeral, and is not described again if appropriate.

(Exemplary Configuration)
(Frame Rate Conversion Section 50)

Figure 18:
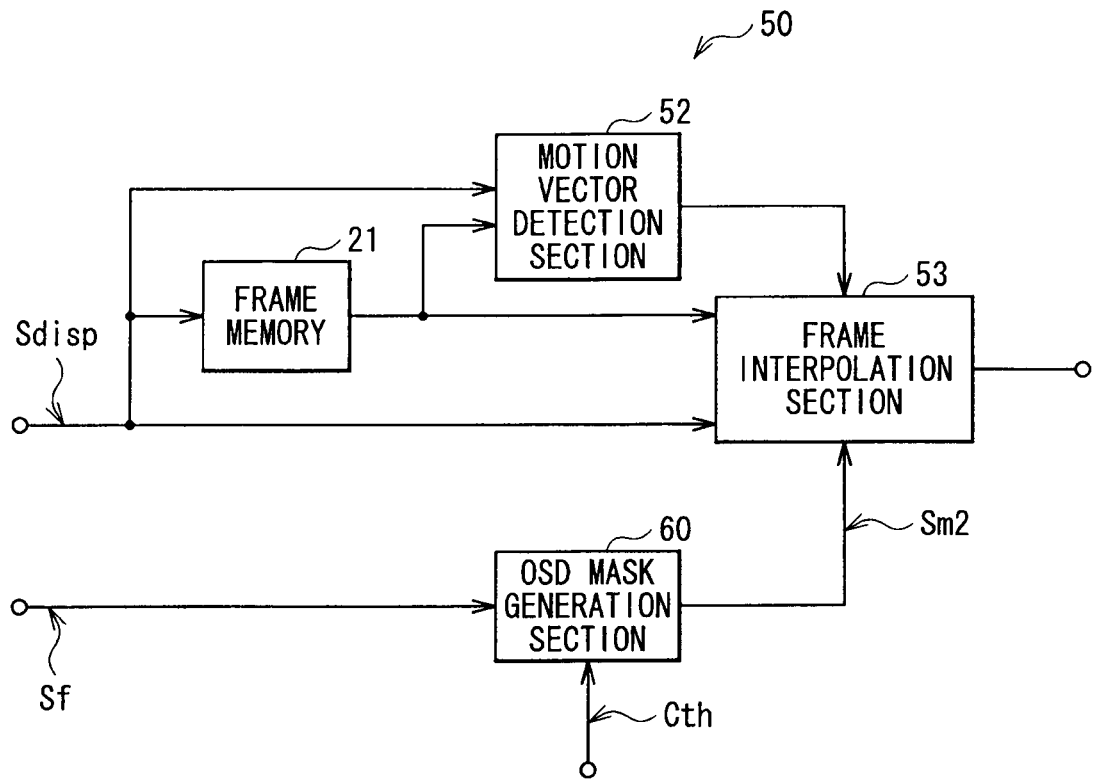
FIG. 18 is a block diagram showing an exemplary configuration of a frame rate conversion section in a second embodiment.

FIG. 18 is a diagram showing an exemplary configuration of a frame rate conversion section 50. The frame rate conversion section 50 includes a motion vector detection section 52, a frame interpolation section 53, and an OSD mask generation section 60.

The motion vector detection section 52 and the frame interpolation section 53 are operated similarly to the motion vector detection section 22 and the frame interpolation section 23 in the first embodiment described above. The difference lies in that the process in the above first embodiment is performed on a pixel basis but in this second embodiment, the process is performed on the basis of a block including a plurality of pixels, i.e., on the basis of a pixel block Bpix.

Figure 19:
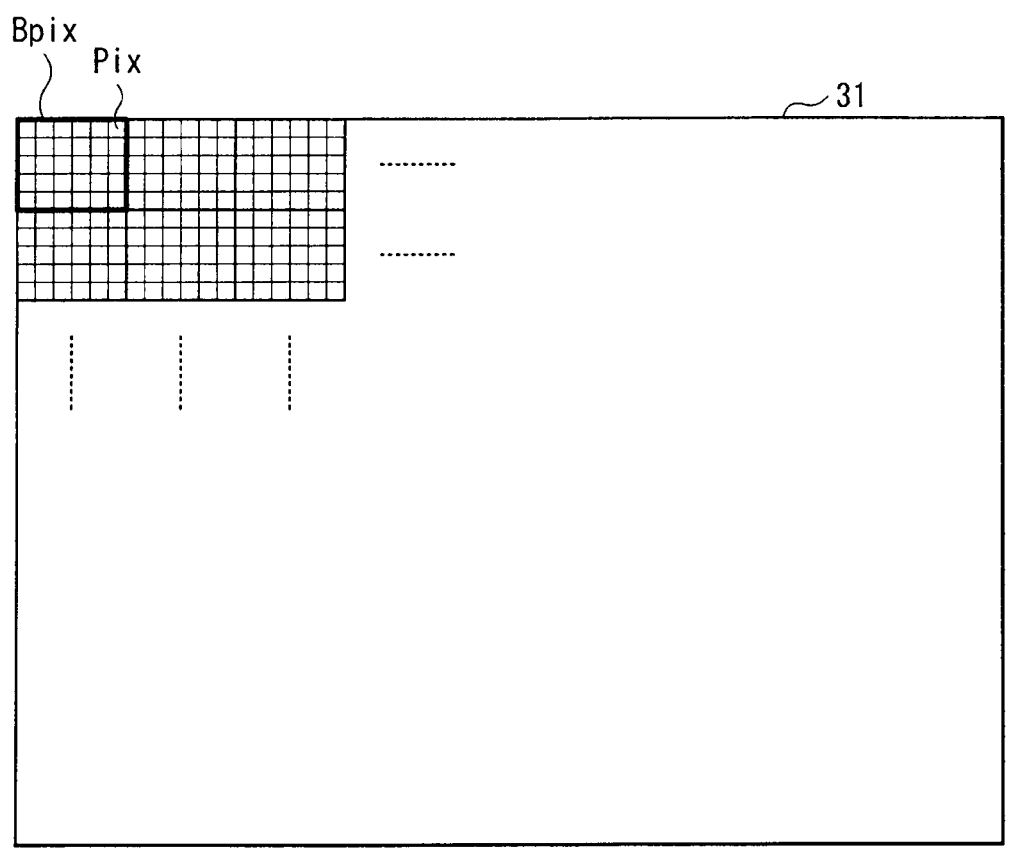
FIG. 19 is a block diagram showing an exemplary configuration of a pixel block Bpix in the second embodiment.

FIG. 19 is a diagram schematically showing a pixel block Bpix. The pixel block Bpix is configured by m×n pixels in total, i.e., m pixels in the horizontal direction of the screen, and n pixels in the vertical direction thereof. Herein, m and n are each a natural number of 1 or larger. In FIG. 19 example, the pixel block Bpix is configured by 30 pixels in total, i.e., six pixels in the horizontal direction (m=6), and five pixels in the vertical direction (n=5).

The motion vector detection section 52 obtains a motion vector for each pixel block Bpix, and the frame interpolation section 53 performs a frame interpolation process to each pixel block Bpix. With a larger pixel block Bpix, i.e., with a pixel block Bpix configured by a larger number of pixels, because detecting the motion of any small display content is difficult, there may be a possibility of failing to perform the frame interpolation process thereto. On the other hand, with a smaller pixel block Bpix, i.e., with a pixel block Bpix configured by a smaller number of pixels, if any display content is with a repeated pattern, for example, there may be a possibility of failing to detect the motion thereof with a good accuracy. The pixel block Bpix is thus defined by size considering such possibilities.

The OSD mask generation section 60 is for generating an OSD mask region Rm2, i.e., an OSD mask signal Sm2, for each pixel block Bpix based on an OSD flag region Rf, i.e., an OSD flag signal Sf, in pixels. That is, the OSD mask generation section 60 is configured to generate an OSD mask region Rm2 for each pixel block Bpix in response to the process performed by the motion vector detection section 52 and the frame interpolation section 53 on the basis of a pixel block Bpix. For generating the OSD mask region Rm2 as such, the OSD mask generation section 60 has the function of adjusting the size of the OSD mask region Rm2 based on an OSD mask adjustment constant Cth.

(OSD Mask Generation Section 60)

Figure 20:
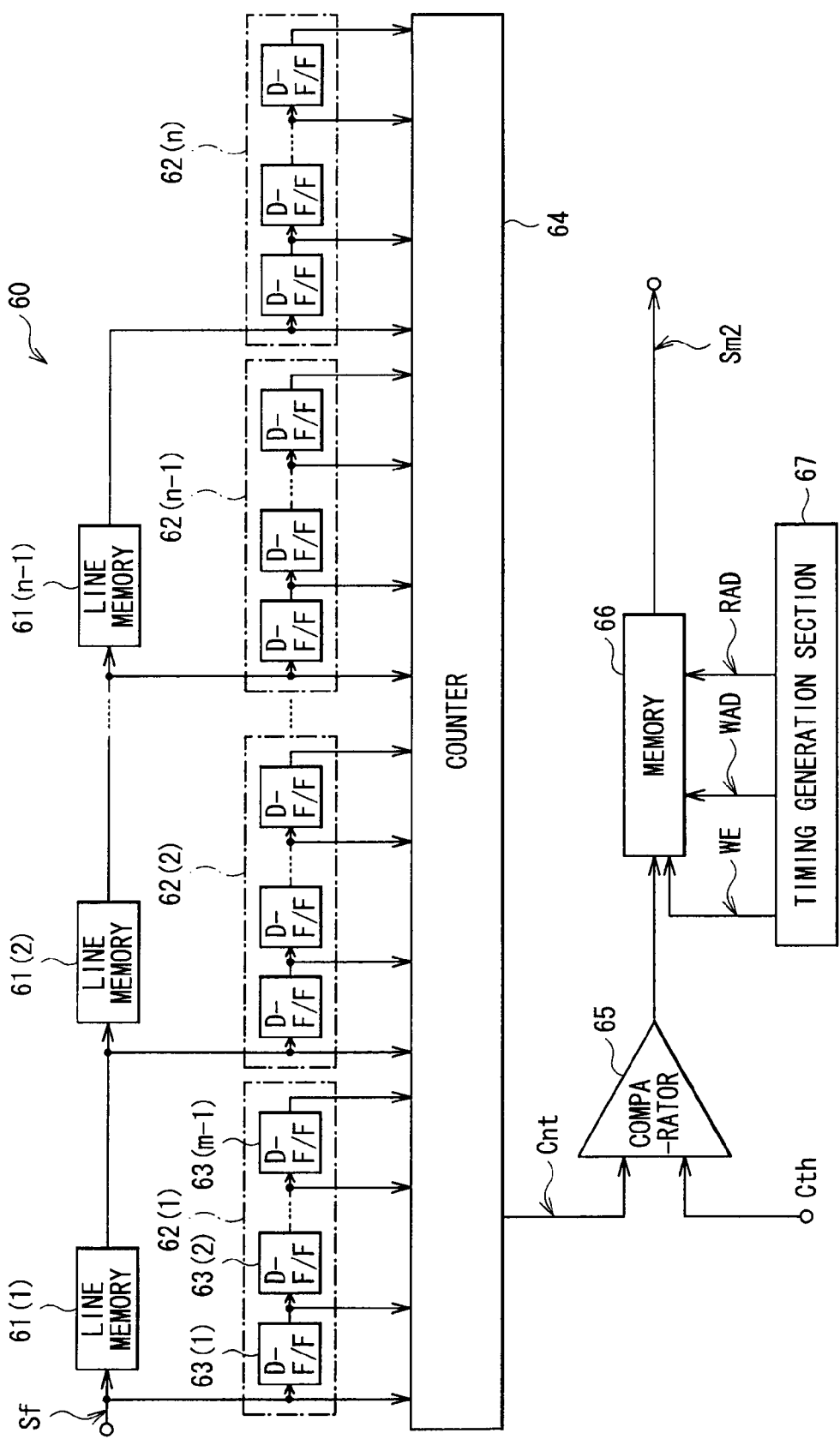
FIG. 20 is a block diagram illustrating an exemplary configuration of an OSD mask generation section in the second embodiment.

FIG. 20 shows an exemplary configuration of the OSD mask generation section 60. The OSD mask generation section 60 includes line memories 61(1) to 61(n-1), DFF blocks 62(1) to 62(n), a counter 64, a comparator 65, a memory 66, and a timing generation section 67.

Similarly to the line memories 41 and 42 in the first embodiment described above, the line memories 61(1) to 61(n-1) are for each retaining information on an input signal of one line, thereby outputting the signal that is delayed by one line. The line memories 61(1) to 61(n-1) are connected together in series. The input terminal of the line memory 61(1) is provided with an OSD flag signal Sf. With such a configuration, the line memory 61(1) outputs the OSD flag signal Sf that is delayed by one line, and the line memory 61(2) outputs the OSD flag signal Sf that is delayed by two lines, for example. Similarly, the line memory 61(n-1) outputs the OSD flag signal Sf that is delayed by (n-1) line(s).

The DFF blocks 62(1) to 62(n) are each for retaining information on an input signal of one line. The input terminal of the DFF block 62(1) is provided with an OSD flag signal Sf. In the DFF blocks 62(2) to 62(n), their input terminals are connected to the output terminals of the line memories 61(1) to 61(n-1), respectively.

The DFF blocks 62(1) to 62(n) are each provided with D-type flip-flops 63(1) to 63(m-1). Similarly to the D-type flip-flops 43 to 48 of the first embodiment above, the D-type flip-flops 63(1) to 63(m-1) each retain information on an input signal of one pixel, thereby outputting the signal that is delayed by one pixel.

With such a configuration, the DFF blocks 62(1) to 62(n) each retain an OSD flag signal of m pixels in the horizontal direction for each line. That is, the DFF blocks 62(1) to 62(n) each retain an OSD flag signal of m×n pixels corresponding to a pixel block Bpix.

The counter 64 has the function of obtaining how many of the OSD flag signals provided by the DFF blocks 62(1) to 63(n) for the m×n pixels are being active. The counter 64 then outputs the resulting number as a count value Cnt.

The comparator 65 is for comparing the count value Cnt provided by the counter 64 with the OSD mask adjustment constant Cth. To be specific, when the count value Cnt is larger than the OSD mask adjustment constant Cth, the output of the comparator 65 is high in level, i.e., is active, and when the count value Cnt is equal to or smaller than the OSD mask adjustment constant Cth, the output thereof is low in level.

The memory 66 is for retaining the comparison result provided by the comparator 65. The timing generation section 67 is for controlling the memory 66 in terms of writing and reading. The timing generation section 67 generates a write enable signal WE on the basis of a pixel block Bpix. Based on this write enable signal WE, the memory 66 performs writing of the comparison result provided by the comparator 65. Note here that the memory 66 performing the writing as such to the memory address directed by a write address signal WAD coming from the timing generation section 67.

The memory 66 then outputs data stored at the memory address as an OSD mask signal Sm2. The memory address is the one directed by a read address signal RAD coming from the timing generation section 67.

Herein, the display device 2 is a specific example of a "display device" in one embodiment of the invention, and the OSD mask adjustment constant Cth is a specific example of a "pixel threshold value" in one embodiment of the invention.
(Operation and Effects)

Figure 21A:
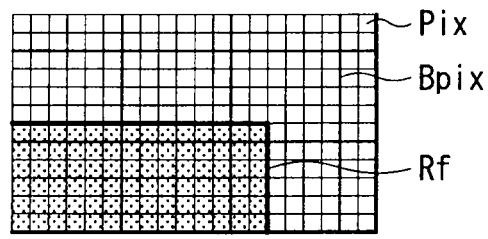
FIGS. 21A to 21E are each a schematic diagram showing an exemplary operation of the OSD mask generation section in the second embodiment.
Figure 21B:
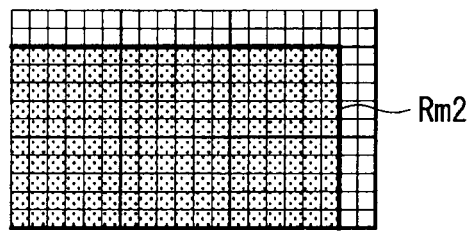
Figure 21C:
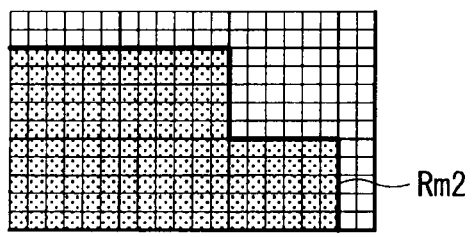
Figure 21D:
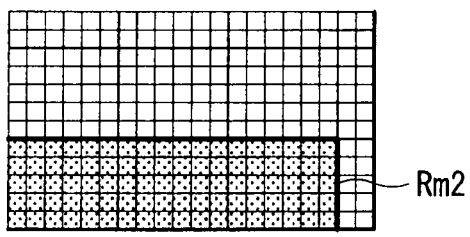
Figure 21E:
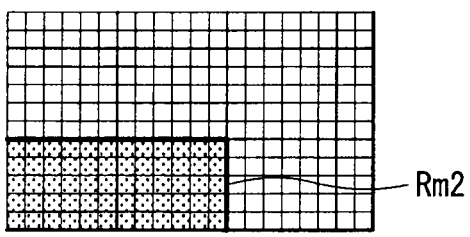

FIGS. 21A to 21E are diagrams showing an exemplary operation of the OSD mask generation section 60. Specifically FIG. 21A shows an OSD flag region Rf, and FIG. 21B to 21E each show an OSD mask region Rm2. In this example, a pixel block Bpix is configured by 30 pixels Pix. FIG. 21B shows a case where the OSD mask adjustment constant Cth is 0, FIG. 21C shows a case where the OSD mask adjustment constant Cth is 3, FIG. 21D shows a case where the OSD mask adjustment constant Cth is 8, and FIG. 21E shows a case where the OSD mask adjustment constant Cth is 29.

As shown in FIG. 21A, the OSD flag region Rf to be provided to the OSD mask generation section 60 indicates the display region of an on-display screen on a pixel basis. When receiving such an OSD flag region Rf, the OSD mask generation section 60 generates the OSD mask region Rm based on the OSD mask adjustment constant Cth as shown in FIGS. 21B to 21E.

When the OSD mask adjustment constant Cth is 0, and when a pixel block Bpix includes one or more pixels where the OSD flag signal is active, the comparator 65 in the OSD mask generation section 60 makes active the OSD mask signal with respect to that pixel block Bpix. In other words, as shown in FIGS. 21A and 21B, the OSD mask generation section 60 determines, as the OSD mask region Rm2, such a pixel block Bpix in which one or more pixels are configuring the OSD flag region Rf. That is, the OSD mask generation section 60 determines to incorporate a pixel block Bpix into the OSD mask region Rm2 when that pixel block Bpix includes one or more OSD picture pixels.

When the OSD mask adjustment constant Cth is 3, similarly, as shown in FIGS. 21A and 21C, the OSD mask generation section 60 determines, as the OSD mask region Rm2, such a pixel block Bpix in which four or more pixels are configuring the OSD flag region Rf.

When the OSD mask adjustment constant Cth is 8, similarly, as shown in FIGS. 21A and 21D, the OSD mask generation section 60 determines, as the OSD mask region Rm2, such a pixel block Bpix in which nine or more pixels are configuring the OSD flag region Rf.

When the OSD mask adjustment constant Cth is 29, similarly, as shown in FIGS. 21A and 21E, the OSD mask generation section 60 determines, as the OSD mask region Rm2, such a pixel block Bpix in which all of the 30 pixels are configuring the OSD flag region Rf.

As described above, using the OSD mask adjustment constant Cth provided as such, the OSD mask generation section 60 adjusts the size of the OSD mask region Rm2. When the OSD mask adjustment constant Cth is 0, as shown in FIG. 21A, it means that the OSD mask region Rm2 is equal to or larger than the OSD flag region Rf, i.e., a so-called "rounding-up mode". This rounding-up mode is the one similarly used by the OSD mask generation section 40 (FIG. 6) in the first embodiment above. On the other hand, when the OSD mask adjustment constant Cth is 29, as shown in FIG. 21E, the OSD mask region Rm2 is equal to or smaller than the OSD flag region Rf, i.e., a so-called "rounding-down mode". This rounding-down mode is the one similarly used by the OSD mask generation section 40C (FIG. 11) in the modified example of the first embodiment above.

Note that, although not shown in FIGS. 21A to 21E, when the OSD mask adjustment constant Cth is 15, the OSD mask generation section 60 determines, as the OSD mask region Rm2, a pixel block Bpix in which 16 or more pixels (i.e., the majority of pixels) are configuring the OSD flag region Rf. That is, the OSD mask generation section 60 determines to incorporate a pixel block Bpix into the OSD mask region Rm2 when that pixel block Bpix includes the number of OSD picture pixels same as a pixel-number of the pixel block Bpix. This is a so-called "majority mode".

As such, the display device 2 is capable of adjusting the size of the OSD mask region Rm2. When the OSD mask region Rm2 is made larger than the on-screen display, although the on-screen display may look awkward with the conspicuous edge thereof, i.e., the boundary between the outside portion of the OSD mask region Rm (the portion for the frame interpolation process) and the inside portion thereof (the portion not for the frame interpolation process), the on-screen display and therearound may be less susceptible to errors. On the other hand, when the OSD mask region Rm2 is made smaller than the on-screen display, because the frame interpolation process may be performed to the end portions of the on-screen display, the outer edge portion as such may suffer from errors. That is, such size increase and decrease are in the relationship of trade-off. With the display device 2, because the OSD mask region Rm2 is made adjustable by the OSD mask adjustment constant Cth, for protecting the on-screen display and therearound from any possible errors, the adjustment can be made more optimally based on the designing of the display device, or based on the user's taste or the characteristics of viewing images, for example.

Based on such an OSD mask region Rm2, the frame interpolation section 53 performs the frame interpolation process on the basis of a pixel block Bpix. That is, the frame interpolation section 53 performs the frame interpolation process only to the outside portion of this OSD mask region Rm2 but not to the inside portion thereof. This accordingly protects the inside portion of the OSD mask region Rm2 from any picture error and noise resulting from the frame interpolation process.
(Effects)

As described above, in this embodiment, the OSD mask region Rm2 is generated on the basis of a pixel block Bpix based on the OSD flag region Rf in pixels. Accordingly, even when the frame interpolation process is performed on the basis of a pixel block Bpix, any region not being a target of the frame interpolation process, i.e., a mask region, can be excluded simply. The remaining effects are similar to those achieved in the first embodiment described above.

Moreover, in this embodiment, because the OSD mask region Rm2 is made adjustable by the OSD mask adjustment constant Cth, for protecting the on-screen display and therearound from any possible errors, the adjustment can be made more optimally based on the designing of the display device, or based on the user's taste or the characteristics of viewing images, for example.

The remaining effects are similar to those achieved in the first embodiment described above.

In the second embodiment described above, similarly to the first embodiment above, the OSD generation section 13 and the picture signal processing section 14 may multiplex the OSD flag signal Sf and the picture signal Sdisp for a supply to the frame rate conversion section.

In the second embodiment as such, similarly to the first embodiment described above, the OSD generation section 13 may generate the OSD mask signal Sm2.

(3. Third Embodiment)

Described next is a display device 3 according to a third embodiment. Compared with the first and second embodiments described above, in this third embodiment, the region of the on-screen display on the screen is notified differently from the OSD generation section to the frame interpolation section. That is, in this embodiment, the region of the on-screen display is notified using the coordinates on the screen. The remaining configuration is similar to that in the first embodiment above (FIG. 1), and others. Note here that any component substantially similar to that in the display devices in the first and second embodiments is provided with the same reference numeral, and is not described again if appropriate.

Figure 22:
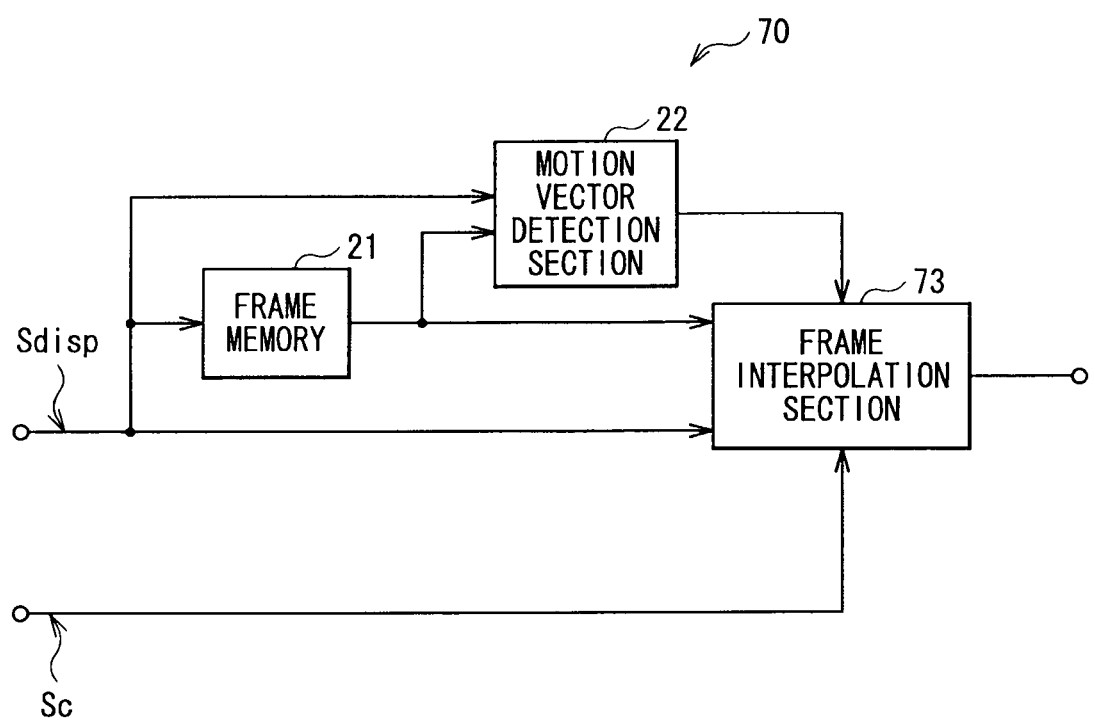
FIG. 22 is a block diagram showing an exemplary configuration of a frame rate conversion section in a third embodiment.

FIG. 22 shows an exemplary configuration of a frame rate conversion section 70 according to the third embodiment. The frame rate conversion section 70 is provided with a frame interpolation section 73. The frame interpolation section 73 is for performing frame rate conversion based on an OSD coordinates signal Sc coming from an OSD generation section (not shown) in this embodiment. To be specific, the OSD coordinates signal Sc indicates the coordinates at the corner(s) of the on-screen display, i.e., the coordinates at the four corners when the on-screen display 32 is quadrangular. The frame interpolation section 73 obtains the region of the on-screen display on the screen based on such information on the coordinates, and performs the frame interpolation process only to the outside portion of the on-screen display.

The display device 3 is a specific example of a "display device" in one embodiment of the invention, and the OSD coordinates signal Sc is a specific example of "coordinates information" in one embodiment of the invention.

As described above, in the third embodiment, the OSD coordinates signal Sc is used to designate the region of the on-screen display for a frame interpolation process to be selectively performed. This accordingly reduces any picture error and noise to be caused by the frame rate conversion with a simple configuration.

While the invention has been described in detail, the foregoing description is illustrative and not restrictive. It is understood that numerous other modifications and variations can be devised without departing from the scope of the invention.

As an example, in the first and second embodiments above, exemplified is the case that the OSD flag signal Sf and the OSD mask signals Sm and Sm2 are assumed as being active when the level thereof is high. This is surely not restrictive, and alternatively, these signals may be assumed as being active when the level thereof is low.

Moreover, in the second embodiment above, exemplified is the case that the pixel block Bpix includes 30 (m=6, and n=5) pixels Pix. This is surely not the only option, and alternatively, the pixel block Bpix may include 29 or less pixels, or 31 or more pixels.

The present application contains subject matter related to that disclosed in Japanese Priority Patent Application JP 2010-115796 filed in the Japan Patent Office on May 19, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device, comprising:
a frame rate conversion section performing frame rate conversion through performing a frame interpolation process on a composite picture frame with use of a motion vector, the composite picture frame being generated through superimposing an on-screen display (OSD) picture region on a picture frame;
a mask generation section generating a mask region based on a flag signal, the flag signal indicating a first region of the composite picture frame that is superimposed by the OSD picture region; and
a display section performing picture display based on a frame-rate-converted composite picture frame provided from the frame rate conversion section, wherein
the mask region creates a boundary of at least one pixel between the first region and a second region of the composite picture frame that is not superimposed by the OSD picture region, and
the frame rate conversion section selectively performs the frame interpolation process to each pixel or to every plural pixels in the second region of the composite picture frame.

2. The display device according to claim 1, wherein
the flag signal is correlated with a timing of each pixel or with every plural pixels in a picture signal of the composite picture frame, the picture signal indicating display properties of the composite picture frame, and
in response to the timing of a pixel of the picture signal coinciding with an active state of the flag signal, the display section overlays a portion of the OSD picture region on the coinciding pixel.

3. The display device according to claim 1, wherein the flag signal represents coordinates of the OSD picture region.

4. The display device according to claim 1, further comprising a superimposition section generating the flag signal as well as the composite picture frame.

5. The display device according to claim 4, wherein
the superimposition section multiplexes the composite picture frame and the OSD region information to output a resultant thereof.

6. The display device according to claim 5, wherein
the composite picture frame and the flag signal are subjected to time-divisional multiplexing for each pixel or for every plural pixels.

7. The display device according to claim 1, wherein
the mask generation section performs generation of the mask region with adjustment of a size thereof based on provided adjustment setting information.

8. The display device according to claim 1, wherein:
the mask generation section generates the mask region configured of pixel blocks each including a plurality of pixels, and
the frame rate conversion section selectively performs the frame interpolation process on each of the pixel blocks.

9. The display device according to claim 8, wherein the mask generation section performs generation of the mask region with adjustment of a size thereof through comparing the number of OSD picture pixels included in each of the pixel blocks with a pixel-number threshold value.

10. The display device according to claim 9, wherein the mask generation section determines to incorporate a pixel block into the mask region when that pixel block includes the same number of OSD picture pixels as a pixel-number of the pixel block.

11. The display device according to claim 9, wherein the mask generation section determines to incorporate a pixel block into the mask region when that pixel block includes one or more OSD picture pixels.

12. The display device according to claim 1, wherein the boundary created by the mask region separates all points of a perimeter of the first region from an edge of the second region by a distance of at least one pixel.

13. The display device according to claim 1, wherein the mask region is generated, based on the flag signal, by determining a pixel of the picture signal that precedes the timing of the coinciding active state of the flag signal.

14. The display device according to claim 1, wherein a combination of the first region and the boundary created by the mask region defines pixels of the composite picture frame that are excluded from the frame interpolation process.

15. A frame rate conversion device, comprising:
a frame rate conversion section performing frame rate conversion through performing a frame interpolation process on a composite picture frame with use of a motion vector, the composite picture frame being generated through superimposing an on-screen display (OSD) on a picture frame, and
a mask generation section generating a mask region based on a flag signal, the flag signal indicating a first region of the composite picture frame that is superimposed by the OSD picture region; wherein
the mask region creates a boundary of at least one pixel between the first region and a second region of the composite picture frame that is not superimposed by the OSD picture region, and
the frame rate conversion section selectively performs the frame interpolation process to each pixel or to every plural pixels in the second region the composite picture frame.

16. A display method, comprising the steps of:
performing frame rate conversion through performing a frame interpolation process on a composite picture frame with use of a motion vector, the composite picture frame being generated through superimposing an on-screen display (OSD) picture region on a picture frame;
generating a mask region based on a flag signal, the flag signal indicating a first region of the composite picture frame superimposed by the OSD picture region; and
performing picture display based on a frame-rate-converted composite picture frame, wherein
the mask region creates a boundary of at least one pixel between the first region and a second region of the composite picture frame that is not superimposed by the OSD picture region, and
the frame interpolation process is selectively performed on each pixel or on every plural pixels in the second region the composite picture.

* * * * *